(12) United States Patent
Sasaki et al.

(10) Patent No.: US 9,914,837 B2
(45) Date of Patent: Mar. 13, 2018

(54) COMPOSITE STRUCTURE, METHOD FOR PRODUCING SAME, PACKAGING MATERIAL AND FORMED PRODUCT USING SAME, AND COATING LIQUID

(71) Applicant: KURARAY CO., LTD., Kurashiki-shi (JP)

(72) Inventors: Ryoichi Sasaki, Kurashiki (JP); Kentaro Yoshida, Houston, TX (US); Mamoru Omoda, Soja (JP); Suehiko Nagano, Kurashiki (JP); Tatsuya Oshita, Kurashiki (JP)

(73) Assignee: KURRAY CO., LTD., Kurashiki-shi (JP)

( * ) Notice: Subject to any disclaimer, the term of this patent is extended or adjusted under 35 U.S.C. 154(b) by 919 days.

(21) Appl. No.: 14/349,594

(22) PCT Filed: Oct. 5, 2012

(86) PCT No.: PCT/JP2012/006435
§ 371 (c)(1),
(2) Date: Apr. 3, 2014

(87) PCT Pub. No.: WO2013/051288
PCT Pub. Date: Apr. 11, 2013

(65) Prior Publication Data
US 2014/0248450 A1    Sep. 4, 2014

(30) Foreign Application Priority Data
Oct. 5, 2011    (JP) .................... 2011-221099

(51) Int. Cl.
| | | |
|---|---|---|
| C09D 5/00 | (2006.01) |
| C08J 7/06 | (2006.01) |
| C08J 7/04 | (2006.01) |
| C01B 25/36 | (2006.01) |
| C04B 28/34 | (2006.01) |
| C09D 1/00 | (2006.01) |
| B32B 7/12 | (2006.01) |
| B32B 27/32 | (2006.01) |
| B32B 27/36 | (2006.01) |
| C09D 5/02 | (2006.01) |
| C09D 7/12 | (2006.01) |
| B32B 9/00 | (2006.01) |
| B32B 9/04 | (2006.01) |
| C04B 111/00 | (2006.01) |
| C08K 3/32 | (2006.01) |

(52) U.S. Cl.
CPC .................. *C09D 5/00* (2013.01); *B32B 7/12* (2013.01); *B32B 9/00* (2013.01); *B32B 9/04* (2013.01); *B32B 27/32* (2013.01); *B32B 27/36* (2013.01); *C01B 25/36* (2013.01); *C04B 28/34* (2013.01); *C04B 28/342* (2013.01); *C08J 7/045* (2013.01); *C08J 7/047* (2013.01); *C08J 7/06* (2013.01); *C09D 1/00* (2013.01); *C09D 5/002* (2013.01); *C09D 5/024* (2013.01); *C09D 7/1216* (2013.01); *C09D 7/1258* (2013.01); *B32B 2307/7244* (2013.01); *B32B 2307/7246* (2013.01); *B32B 2439/70* (2013.01); *C04B 2111/00482* (2013.01); *C04B 2111/00525* (2013.01); *C04B 2111/00534* (2013.01); *C08J 2367/02* (2013.01); *C08J 2377/02* (2013.01); *C08J 2429/04* (2013.01); *C08J 2443/02* (2013.01); *C08K 2003/327* (2013.01); *Y10T 428/1307* (2015.01); *Y10T 428/1334* (2015.01); *Y10T 428/1393* (2015.01); *Y10T 428/25* (2015.01)

(58) Field of Classification Search
CPC ..... C09D 5/00; C08J 7/047; C08J 7/06; C08J 2367/02; C08J 2429/04; C08J 2377/02
See application file for complete search history.

(56) References Cited

U.S. PATENT DOCUMENTS

| 5,233,065 A | 8/1993 | Sharif |
|---|---|---|
| 2006/0057407 A1 | 3/2006 | Sambasivan et al. |

(Continued)

FOREIGN PATENT DOCUMENTS

| EP | 2 554 367 A1 | 2/2013 |
|---|---|---|
| GB | 1 411 596 | 10/1975 |

(Continued)

OTHER PUBLICATIONS

Extended European Search Report dated Jul. 1, 2015 in Patent Application No. 12837706.6.

(Continued)

*Primary Examiner* — Robert Harlan
(74) *Attorney, Agent, or Firm* — Oblon, McClelland, Maier & Neustadt, L.L.P.

(57) ABSTRACT

The method disclosed includes: a step (I) of preparing a dispersion liquid (S) including an aluminum compound (A); a step (II) of mixing the dispersion liquid (S) and a predetermined phosphorus compound (B) so as to prepare a coating liquid (U); a step (III) of applying the coating liquid (U) onto the base (X) so as to form a precursor layer of the layer (Y); and a step (IV) of subjecting the precursor layer to heat treatment at a temperature of 110° C. or more so as to form the layer (Y). The aluminum compound (A) can be formed by adding an acid to a solution including an aluminate. The number of moles ($N_M$) of aluminum atoms derived from the aluminum compound (A) and the number of moles ($N_P$) of phosphorus atoms derived from the phosphorus compound (B) satisfy $0.8 \leq (N_M)/(N_P) \leq 4.5$.

30 Claims, No Drawings

(56) References Cited

U.S. PATENT DOCUMENTS

| | | |
|---|---|---|
| 2009/0217841 A1 | 9/2009 | Galembeck et al. |
| 2012/0094128 A1 | 4/2012 | Foscante et al. |
| 2013/0034674 A1 | 2/2013 | Yoshida et al. |

FOREIGN PATENT DOCUMENTS

| | | | |
|---|---|---|---|
| GB | 1 411 596 | * 11/1975 | ............. B32B 27/06 |
| GB | 1 436 732 | 5/1976 | |
| JP | 55-46969 A | 4/1980 | |
| JP | 2002-145649 A | 5/2002 | |
| JP | 2008-516015 A | 5/2008 | |
| WO | WO 02/057276 A1 | 7/2002 | |
| WO | WO 2006/042116 A2 | 4/2006 | |
| WO | WO 2009/100510 A2 | 8/2009 | |
| WO | WO 2011/122036 A1 | 10/2011 | |
| WO | WO 2012/051589 A1 | 4/2012 | |

OTHER PUBLICATIONS

International Search Report dated Dec. 11, 2012 in PCT/JP2012/006435.
Examination report dated Apr. 27, 2017 in Australian Patent Application No. 2012319846.
U.S. Appl. No. 14/349,251, filed Apr. 2, 2014, Sasaki, et al.
U.S. Appl. No. 14/349,809, filed Apr. 4, 2014, Yoshida, et al.

* cited by examiner

COMPOSITE STRUCTURE, METHOD FOR PRODUCING SAME, PACKAGING MATERIAL AND FORMED PRODUCT USING SAME, AND COATING LIQUID

TECHNICAL FIELD

The present invention relates to: a composite structure; a method for producing the composite structure; a packaging material and a formed product using the composite structure; and a coating liquid.

BACKGROUND ART

A coating film including, as constituents, atoms of a metal such as aluminum and phosphorus atoms is conventionally known. For example, there is known an organic polymer formed product having a gas permeation-preventing coating film made of a metal orthophosphate whose main constituent is aluminum (Patent Literature 1: JP 55 (1980)-46969 A). JP 55 (1980)-46969 A discloses a method for forming a gas permeation-preventing coating film by applying a dispersion liquid or a solution of a metal orthophosphate to an organic polymer formed product. JP 55 (1980)-46969 A discloses a method for forming a dispersion liquid or a solution of a metal orthophosphate, the method consisting of respectively dissolving an aluminum ion source and a phosphorus ion source in separate media, and then mixing the resultant solutions together.

There is also known a composite body composed of: a base made of metal, metal alloy, plastic or the like; and a coating component including a particular aluminum phosphate compound (see Patent Literature 2: JP 2008-516015 T). JP 2008-516015 T discloses a method for forming a coating using a solution including an aluminum salt and a phosphoric acid ester in an organic solvent. JP 2008-516015 T also discloses that the coating component includes a structural site that shows absorption of a radioactive ray at about 1230 $cm^{-1}$ in an infrared absorption spectrum.

CITATION LIST

Patent Literature

Patent Literature 1: JP 55 (1980)-46969 A
Patent Literature 2: JP 2008-516015 T

SUMMARY OF INVENTION

Technical Problem

However, the above conventional coating layers do not have sufficient gas barrier properties or water vapor barrier properties. In addition, the above conventional coating layers do not have sufficient hot-water resistance. Therefore, the gas barrier properties or water vapor barrier properties of the above conventional coating layers are likely to be deteriorated by hot-water treatment such as retorting, and the range of uses is considerably limited. For example, the above conventional coating layers are limited in use for food packaging materials to be subjected to retorting.

In addition, in order to continuously supply materials having stable performance, an inexpensive and simple production method has been demanded.

Under such circumstances, one object of the present invention is to provide a method for producing a composite structure that is excellent in both gas barrier properties and water vapor barrier properties and that can maintain both of the barrier properties at high levels even after retorting.

Solution to Problem

As a result of a diligent study to attain the above object, the present inventors have found an inexpensive and simple method capable of forming a coating layer that is excellent in both gas barrier properties and water vapor barrier properties and that can maintain both of the barrier properties at high levels even after retorting. The method uses a coating liquid obtained by mixing a solution of a phosphorus compound and a dispersion liquid of an aluminum compound that can be precipitated by addition of an acid to an aluminate solution. Through a further study based on the new findings, the present inventors have completed the present invention.

The coating liquid of the present invention is a coating liquid produced by a production method including: a step (I) of preparing a dispersion liquid (S) including an aluminum compound (A); and a step (II) of mixing at least the dispersion liquid (S) and a phosphorus compound (B) having a site capable of reacting with the aluminum compound (A). The aluminum compound (A) is a compound formed by adding an acid to an aluminate solution. The number of moles ($N_M$) of aluminum atoms derived from the aluminum compound (A) and the number of moles ($N_P$) of phosphorus atoms derived from the phosphorus compound (B) satisfy $0.8 \leq (N_M)/(N_P) \leq 4.5$. Particles in the coating liquid have a particle size of 2000 nm or less.

The method of the present invention for producing a composite structure is a method for producing a composite structure including a base (X) and a layer (Y) stacked on the base (X). The method includes: a step (I) of preparing a dispersion liquid (S) including an aluminum compound (A); a step (II) of mixing at least the dispersion liquid (S) and a phosphorus compound (B) having a site capable of reacting with the aluminum compound (A) so as to prepare a coating liquid (U); a step (III) of applying the coating liquid (U) onto the base (X) so as to form a precursor layer of the layer (Y) on the base (X); and a step (IV) of subjecting the precursor layer to heat treatment at a temperature of 110° C. or more so as to form the layer (Y). The aluminum compound (A) is a compound formed by adding an acid to an aluminate solution. In the coating liquid (U), the number of moles ($N_M$) of aluminum atoms derived from the aluminum compound (A) and the number of moles ($N_P$) of phosphorus atoms derived from the phosphorus compound (B) satisfy $0.8 \leq (N_M)/(N_P) \leq 4.5$.

The step (I) may include: a step (I-a) of adding the acid to the aluminate solution so as to obtain an aqueous suspension (D) including the aluminum compound (A); and a step (I-b) of removing a solvent of the aqueous suspension (D) and then performing desalting so as to obtain the aluminum compound (A). Furthermore, the step (II) may be a step of mixing the dispersion liquid (S) and a solution (T) including the phosphorus compound (B) so as to prepare the coating liquid (U). In this case, the aluminate solution may include an organic compound containing a hydroxyl group.

In the coating liquid and the production method, the aluminate solution may include an organic compound containing a hydroxyl group.

In the coating liquid and the production method, the aluminate solution may include a polymer (C) containing at least one functional group (f) selected from the group consisting of a hydroxyl group, a carboxyl group, a carboxylic acid anhydride group, and a salt of a carboxyl group.

In the coating liquid and the production method, the aluminate solution may include a polymer containing a hydroxyl group.

In the coating liquid and the production method, the step (I) may include a step (I-c) of dispersing the aluminum compound (A) obtained in the step (I-b) into a liquid by high-shear stirring so as to prepare the dispersion liquid (S).

In the coating liquid and the production method, the phosphorus compound (B) may be at least one compound selected from the group consisting of phosphoric acid, polyphosphoric acid, phosphorous acid, phosphonic acid, and derivatives thereof.

In the coating liquid and the production method, the coating liquid (U) may include a polymer (C) containing at least one functional group (f) selected from the group consisting of a hydroxyl group, a carboxyl group, a carboxylic acid anhydride group, and a salt of a carboxyl group. In this case, the polymer (C) may be at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

In the coating liquid and the production method, the coating liquid (U) may further include at least one acid compound (D) selected from the group consisting of acetic acid, hydrochloric acid, nitric acid, trifluoroacetic acid, and trichloroacetic acid.

A composite structure of the present invention is obtained by the production method of the present invention.

In the composite structure of the present invention, when an infrared absorption spectrum of the layer (Y) is measured in a range of 800 $cm^{-1}$ to 1400 $cm^{-1}$, a wavenumber ($n^1$) at which maximum infrared absorption occurs may be in a range of 1080 $cm^{-1}$ to 1130 $cm^{-1}$.

In the composite structure of the present invention, the base (X) may be in the form of a layer.

In the composite structure of the present invention, the base (X) may include at least one layer selected from the group consisting of a thermoplastic resin film layer, a paper layer, and an inorganic deposited layer.

In the composite structure of the present invention, a moisture permeability as measured under conditions of 40° C. and 90/0% RH may be 5 g/($m^2$·day) or less. In the composite structure of the present invention, an oxygen transmission rate as measured under conditions of 20° C. and 85% RH may be 1 ml/($m^2$·day·atm) or less. In the composite structure of the present invention, a moisture permeability as measured under conditions of 40° C. and 90/0% RH after immersion in 120° C. hot water for 30 minutes may be not more than twice a moisture permeability as measured under conditions of 40° C. and 90/0% RH before the immersion. In the composite structure of the present invention, an oxygen transmission rate as measured under conditions of 20° C. and 85% RH after immersion in 120° C. hot water for 30 minutes may be not more than twice an oxygen transmission rate as measured under conditions of 20° C. and 85% RH before the immersion.

A packaging material of the present invention includes the composite structure of the present invention. The packaging material of the present invention may be a packaging material for retort foods.

A formed product of the present invention is formed by use of the packaging material of the present invention. The formed product of the present invention may be a vertical fill form seal pouch, a vacuum packaging pouch, a spout pouch, a laminated tube container, an infusion bag, a container cover, a paper container, or a vacuum insulator.

Advantageous Effects of Invention

The production method and the coating liquid of the present invention allow obtaining a composite structure that is excellent in both gas barrier properties and water vapor barrier properties and that can maintain both of the barrier properties at high levels even after retorting. In addition, a composite structure excellent in appearance can be obtained. In the present specification, the term "gas barrier properties" means barrier performance against other gases than water vapor, unless otherwise specified. In the present specification, the simpler term "barrier properties" means both the gas barrier properties and the water vapor barrier properties.

DESCRIPTION OF EMBODIMENTS

Hereinafter, embodiments of the present invention will be described. In the following description, specific materials (compounds etc.) are mentioned in some cases as examples of a material exhibiting a particular function. However, the present invention is not limited to embodiments using the specific materials. One of the materials mentioned as examples may be used alone or two or more thereof may be used in combination, unless otherwise specified.

[Composite Structure Production Method and Coating Liquid Used Therein]

Hereinafter, a composite structure production method of the present invention and a coating liquid used in the production method will be described. This production method is a method for producing a composite structure including a base (X) and a layer (Y) stacked on the base (X). This production method includes the steps (I) to (IV) described below. In the step (I), a dispersion liquid (S) including an aluminum compound (A) is prepared. In the step (II), at least the dispersion liquid (S) and a phosphorus compound (B) having a site capable of reacting with the aluminum compound (A) are mixed to prepare a coating liquid (U). In the step (III), the coating liquid (U) is applied onto the base (X) to form a precursor layer of the layer (Y) on the base (X). In the step (IV), the precursor layer is subjected to heat treatment at a temperature of 110° C. or more to form the layer (Y). The aluminum compound (A) is a compound formed by adding an acid to an aluminate solution. In the coating liquid (U), the number of moles ($N_M$) of aluminum atoms derived from the aluminum compound (A) and the number of moles ($N_P$) of phosphorus atoms derived from the phosphorus compound (B) satisfy 0.8≤ ($N_M$)/($N_P$)≤4.5.

[Step (I)]

The aluminate solution is a solution including an aluminate. It is thought that the negative ion that is a constituent of an aluminate is, for example, in the form of $[Al(OH)_4]^-$ or $[Al(OH)_6]^{3-}$. The aluminate solution can be obtained, for example, by dissolving aluminum hydroxide in a basic solvent. The aluminate solution may be referred to as a solution (SA) hereinafter. The step (I) may include: a step (I-a) of adding an acid to the aluminate solution so as to obtain an aqueous suspension (D) including the aluminum compound (A); and a step (I-b) of removing the solvent of the aqueous suspension (D) and then performing desalting so as to obtain the aluminum compound (A).

Examples of the positive ion that is a constituent of the aluminate include sodium ion, potassium ion, magnesium ion, zinc ion, iron ion, calcium ion, barium ion, and beryllium ion. An aluminate including any of these ions or a concentrated solution of such an aluminate can easily be obtained by a commonly-known method. An example of a solvent that can be used is a solvent containing water, and is typically water. As described later, an alcohol may be added to water serving as the solvent.

An example of the method for preparing the aluminate solution will be described below. Although the description is given using an example in which the alkali species is sodium (that is, an example in which the positive ion that is a constituent of the aluminate is sodium ion), a similar method can be employed also in the case where the alkali species is a different element.

The aluminate solution can be prepared by dissolving aluminum hydroxide in a sodium hydroxide aqueous solution. The temperature of the reaction system for dissolution of the aluminum hydroxide in the sodium hydroxide aqueous solution is preferably in the range of 60° C. to 140° C., more preferably in the range of 80° C. to 120° C., and even more preferably in the range of 90° C. to 100° C. When the temperature of the reaction system is lower than 60° C., the materials remain unreacted in some cases. When the temperature of the reaction system is higher than 140° C., significant evaporation of the solvent occurs. The time required for the dissolution is not limited, and is usually in the range of 0.1 hours to 3 hours.

The concentration of the sodium hydroxide aqueous solution is preferably in the range of 10 mass % to 80 mass %, more preferably in the range of 15 mass % to 60 mass %, and even more preferably in the range of 20 mass % to 40 mass %. When the concentration is less than 10 mass %, the rate of dissolution of the aluminum hydroxide is reduced. When the concentration is 80 mass % or more, the aqueous solution has an increased viscosity and is difficult to handle. The concentration of the solution obtained by dissolving the aluminum hydroxide in the sodium hydroxide aqueous solution is not particularly limited. In an example, the aluminum hydroxide is added so that the mass of the aluminum hydroxide is 10% to 80% of the mass of the aluminate solution.

The acid added in the step (I) (e.g., step (I-a)) is not particularly limited. For example, acetic acid, hydrochloric acid, or nitric acid can be used. The temperature of the solution at the time of addition of the acid is not particularly limited, and may be, for example, in the range of 10° C. to 60° C. The acid is preferably added so that the resultant pH is in the range of 4.0 to 11.0, more preferably in the range of 6.0 to 9.5, and even more preferably in the range of 6.5 to 8.0.

[Hydroxyl Group-Containing Organic Compound, Polymer (C) Mentioned Above, and Polymer Containing Hydroxyl Group]

The solution (SA) (aluminate solution) may include an organic compound containing a hydroxyl group, the above-mentioned polymer (C), or a polymer containing a hydroxyl group. When the solution (SA) includes an organic compound or a polymer containing a highly hydrophilic functional group such as a hydroxyl group, the dispersibility of the aluminum compound (A) in the solvent is improved. The hydroxyl group-containing organic compound is preferably a water-soluble organic compound containing a hydroxyl group. Examples of the water-soluble organic compound containing a hydroxyl group include: monoalcohols such as methanol, ethanol, and isopropyl alcohol; polyhydric alcohols such as ethylene glycol and glycerin; and polyvinyl alcohols. Examples of the polymer (C) will be given later. Among the above compounds, the polymer containing a hydroxyl group is preferable, and polyvinyl alcohol is more preferable since the intended effect is obtained by a small amount of polyvinyl alcohol.

The amount of the hydroxyl group-containing organic compound, the polymer (C), or the polymer containing a hydroxyl group is not particularly limited, and may be, for example, in the range of 0.01 mass % to 99.00 mass %.

When the aluminate solution is mixed with a solution including the hydroxyl group-containing organic compound, the temperature of the solution including the hydroxyl group-containing organic compound may be, for example, in the range of 10° C. to 99° C.

In the step (I-b), the solvent of the aqueous suspension (D) is removed, then desalting is performed, and thus a solid of the aluminum compound (A) can be obtained.

Examples of the method for removing the solvent include a method using an evaporator and a method using a dryer (a hot-air dryer or a vacuum dryer). The drying temperature is preferably in the range of 20° C. to 160° C., more preferably in the range of 25° C. to 120° C., and even more preferably in the range of 30° C. to 80° C. When the drying temperature is higher than 160° C., it may happen that the solvent is vigorously boiled or the aluminum compound (A) undergoes a reaction.

Another method capable of removing the solvent is to filter the aqueous suspension (D). This method may be employed in the case where a polymer such as polyvinyl alcohol is not contained.

In the desalting treatment, a salt produced from the alkali species of the aluminate and the added acid is removed. Specifically, a solid material obtained by removing the solvent of the aqueous suspension (D) is washed with a washing liquid to remove the salt. The solvent used as the washing liquid is not particularly limited. Water can be suitably used. The temperature of the washing liquid is not particularly limited, and may be, for example, in the range of 10° C. to 60° C.

The washing liquid is removed by filtration, followed by drying (hot-air drying, vacuum drying, or the like) to obtain the aluminum compound (A) in the form of a solid. The drying temperature is preferably in the range of 20° C. to 160° C., more preferably in the range of 25° C. to 120° C., and even more preferably in the range of 30° C. to 80° C. When the drying temperature is higher than 160° C., it may happen that the aluminum compound (A) undergoes a reaction.

The dispersion liquid (5) is obtained by dispersing the aluminum compound (A) in a solvent. For example, the step (I) may include a step (I-c) of dispersing the aluminum compound (A) obtained in the step (I-b) into a liquid by high-shear stirring so as to prepare the dispersion liquid (S). The high-shear stirring can make the particle sizes small and uniform, and is thus preferable. The dispersion medium of the dispersion liquid is not particularly limited. For example, water or an alcohol such as methanol, ethanol, isopropanol, or normal-propanol, is suitably used. The dispersion medium preferably includes water, and may include water and an alcohol.

Examples of the method for dispersing the aluminum compound (A) in a dispersion medium include a method using a high-shear mixer (a homomixer, a homogenizer, or the like) and a method using a pulverizer (a ball mill, a jet mill, or the like).

In stirring by a homomixer or a homogenizer, the peripheral speed of the stirring blade tip is preferably 12 m/s or more, more preferably 15 m/s or more, and even more preferably 19 m/s or more. The peripheral speed less than 12 m/s may lead to a large particle size of the aluminum compound (A).

The particle size of the aluminum compound (A) in the dispersion liquid (S) is preferably in the range of 1 nm to 300 nm, more preferably in the range of 1 nm to 200 nm, and even more preferably in the range of 1 nm to 100 nm. When the particle size is 300 nm or more, the barrier properties tend to be deteriorated. The particle size of the aluminum compound (A) in the dispersion liquid can be measured by a dynamic light scattering method. For example, the measurement can be carried out using an apparatus (ELSX-2) manufactured by Otsuka Electronics Co., Ltd. in the same manner as that for measurement of the particle size of the particles in the coating liquid (U).

The length of time taken for dispersion of the aluminum compound (A) in the dispersion medium is not particularly limited, and is usually in the range of 0.1 hours to 3 hours. The temperature of the dispersion medium is preferably 2° C. to 50° C., more preferably 2° C. to 40° C., and even more preferably 2° C. to 30° C. When the temperature of the dispersion medium is 50° C. or more, the particle size of the aluminum compound (A) tends to be large.

The content of the aluminum compound (A) in the dispersion liquid (5) is preferably in the range of 0.1 mass % to 30 mass %, more preferably in the range of 1 mass % to 20 mass %, and even more preferably in the range of 2 mass % to 15 mass %.

[Step (II)]

In the step (II), at least the dispersion liquid (S) and the phosphorus compound (B) having a site capable of reacting with the aluminum compound (A) are mixed to prepare the coating liquid (U). The coating liquid (U) may be prepared by mixing the dispersion liquid (S), the phosphorus compound (B), and another substance. The coating liquid (U) is preferably prepared by mixing at least the dispersion liquid (S) and a solution (T) including the phosphorus compound (B).

[Solution (T)]

The solution (T) including the phosphorus compound (B) can be prepared by dissolving the phosphorus compound (B) in a solvent. In the case where the solubility of the phosphorus compound (B) is low, the dissolution may be promoted by performing heating treatment or ultrasonic treatment.

The solvent used for the preparation of the solution (T) may be selected as appropriate depending on the type of the phosphorus compound (B), and preferably includes water. As long as the dissolution of the phosphorus compound (B) is not hindered, the solvent may include: an alcohol such as methanol or ethanol; an ether such as tetrahydrofuran, dioxane, trioxane, or dimethoxyethane; a ketone such as acetone or methyl ethyl ketone; a glycol such as ethylene glycol or propylene glycol; a glycol derivative such as methyl cellosolve, ethyl cellosolve, or n-butyl cellosolve; glycerin; acetonitrile; an amide such as dimethylformamide; dimethylsulfoxide; sulfolane, or the like.

The content of the phosphorus compound (B) in the solution (T) is preferably in the range of 0.1 mass % to 99 mass %, more preferably in the range of 0.1 mass % to 95 mass %, and even more preferably in the range of 0.1 mass % to 90 mass %. The content of the phosphorus compound (B) in the solution (T) may be in the range of 0.1 mass % to 50 mass %, may be in the range of 1 mass % to 40 mass %, or may be in the range of 2 mass % to 30 mass %.

[Phosphorus Compound]

The phosphorus compound (B) contains a site capable of reacting with the aluminum compound (A), and typically contains a plurality of such sites. In a preferred example, the phosphorus compound (B) contains 2 to 20 such sites (atomic groups or functional groups). Examples of such a site include a site capable of reacting with a hydroxyl group present in the surface of the aluminum compound (A). Examples of such a site include a halogen atom directly bonded to a phosphorus atom, and an oxygen atom directly bonded to a phosphorus atom. Such a halogen atom or an oxygen atom can cause a condensation reaction (hydrolytic condensation reaction) with a hydroxyl group present in the surface of the aluminum compound (A).

For example, a compound having a structure in which a halogen atom and/or an oxygen atom is directly bonded to a phosphorus atom can be used as the phosphorus compound (B). When such a phosphorus compound (B) is used, bonding can be formed by (hydrolytic) condensation with hydroxyl groups present in the surface of the aluminum compound (A). The phosphorus compound (B) may have one phosphorus atom or two or more phosphorus atoms.

Examples of the phosphorus compound (B) include phosphoric acid, polyphosphoric acid, phosphorous acid, phosphonic acid, and derivatives thereof. Specific examples of the polyphosphoric acid include pyrophosphoric acid, triphosphoric acid, and polyphosphoric acid resulting from condensation of four or more phosphoric acid molecules. Examples of the derivatives include salts, (partial) esters, halides (chlorides etc.), and dehydration products (diphosphorus pentoxide etc.), of phosphoric acid, polyphosphoric acid, phosphorous acid, and phosphonic acid. In addition, examples of the derivatives of phosphonic acid include: compounds (e.g., nitrilotris(methylenephosphonic acid), N,N,N',N'-ethylenediaminetetrakis(methylenephosphonic acid), and the like) in which a hydrogen atom directly bonded to a phosphorus atom of phosphonic acid (H—P(=O)(OH)$_2$) is substituted by an alkyl group that may have various types of functional groups; and salts, (partial) esters, halides, and dehydration products of such compounds. Furthermore, an organic polymer having phosphorus atoms, such as phosphorylated starch, can also be used as the phosphorus compound (B). One of these phosphorus compounds (B) may be used alone or two or more thereof may be used in combination. Among these phosphorus compounds (B), phosphoric acid is preferably used alone or in combination with another phosphorus compound, in terms of the stability of the later-described coating liquid (U) used for formation of the layer (Y) and in terms of more excellent barrier properties of the resultant composite structure.

When mixing the dispersion liquid (S) and the solution (T), it is preferable to perform the mixing at a reduced addition rate under vigorous stirring in order to suppress a local reaction. In this case, the solution (T) may be added to the dispersion liquid (S) being stirred, or the dispersion liquid (S) may be added to the solution (T) being stirred. The coating liquid (U) that is excellent in storage stability can be obtained in some cases by maintaining the temperature during the mixing at 30° C. or less (e.g., 20° C. or less). Furthermore, the coating liquid (U) that is excellent in storage stability can be obtained in some cases by continuing the stirring further for about 30 minutes after the completion of the mixing.

The coating liquid (U) may include the polymer (C). The method for having the polymer (C) included in the coating liquid (U) is not particularly limited. For example, the polymer (C) in the form of a powder or a pellet may be added to and then dissolved in the dispersion liquid (S), the solution (T), or a mixed liquid of the dispersion liquid (S) and the solution (T). Alternatively, a solution of the polymer (C) may be added to and mixed with the dispersion liquid (S), the solution (T), or a mixed liquid of the dispersion liquid (S) and the solution (T). Alternatively, the dispersion liquid (S), the solution (T), or a mixed liquid of the dispersion liquid (S) and the solution (T) may be added to and mixed with a solution of the polymer (C). By having the polymer (C) contained in the solution (T), the rate of reaction between the aluminum compound (A) and the phosphorus compound (B) is slowed at the time of mixing of the dispersion liquid (S) and the solution (T) in the step (II), with the result that the coating liquid (U) that is excellent in temporal stability may be obtained.

When the coating liquid (U) includes the polymer (C), a composite structure including the layer (Y) containing the polymer (C) can easily be produced.

[Polymer (C)]

The polymer (C) is a polymer having at least one functional group (f) selected from the group consisting of a hydroxyl group, a carboxyl group, a carboxylic acid anhydride group, and a salt of a carboxyl group. In the layer (Y) included in the composite structure, the polymer (C) may be directly or indirectly bonded to either or both the particles of the aluminum compound (A) and the phosphorus atoms derived from the phosphorus compound (B) through the functional group (f) of the polymer (C). In the layer (Y) included in the composite structure, a reaction product (R) described later may have a polymer (C)-derived portion resulting, for example, from a reaction of the polymer (C) with the aluminum compound (A) or the phosphorus compound (B). In the present specification, a polymer meeting the requirements for the phosphorus compound (B) and including the functional group (f) is not categorized as the polymer (C), but is regarded as the phosphorus compound (B).

A polymer including a constitutional unit having the functional group (f) can be used as the polymer (C). Specific examples of such a constitutional unit include constitutional units having one or more functional groups (f), such as a vinyl alcohol unit, an acrylic acid unit, a methacrylic acid unit, a maleic acid unit, an itaconic acid unit, a maleic anhydride unit, and a phthalic anhydride unit. The polymer (C) may include only one type of constitutional unit having the functional group (f) or may include two or more types of constitutional units having the functional group (f).

In order to obtain the composite structure that has more excellent barrier properties and hot-water resistance, the proportion of the constitutional unit having the functional group (f) in all the constitutional units of the polymer (C) is preferably 10 mol % or more, more preferably 20 mol % or more, even more preferably 40 mol % or more, and particularly preferably 70 mol % or more, and may be 100 mol %.

When the polymer (C) is constituted by the constitutional unit having the functional group (f) and other constitutional units, the type of the other constitutional units is not particularly limited. Examples of the other constitutional units include: constitutional units derived from (meth)acrylic acid esters, such as a methyl acrylate unit, a methyl methacrylate unit, an ethyl acrylate unit, an ethyl methacrylate unit, a butyl acrylate unit, and a butyl methacrylate unit; constitutional units derived from vinyl esters, such as a vinyl formate unit and a vinyl acetate unit; constitutional units derived from aromatic vinyl, such as a styrene unit and a p-styrenesulfonic acid unit; and constitutional units derived from olefins, such as an ethylene unit, a propylene unit, and an isobutylene unit. When the polymer (C) includes two or more types of constitutional units, the polymer (C) may be any of an alternating copolymer, a random copolymer, a block copolymer, and a tapered copolymer.

Specific examples of the polymer (C) that has a hydroxyl group include polyvinyl alcohol, partially-saponified polyvinyl acetate, polyethylene glycol, polyhydroxyethyl(meth) acrylate, polysaccharides such as starch, and polysaccharide derivatives derived from polysaccharides. Specific examples of the polymer (C) that has a carboxyl group, a carboxylic acid anhydride group, or a salt of a carboxyl group include polyacrylic acid, polymethacrylic acid, poly(acrylic acid/methacrylic acid), and salts thereof. Specific examples of the polymer (C) that has a constitutional unit free from the functional group (f) include ethylene-vinyl alcohol copolymer, ethylene-maleic anhydride copolymer, styrene-maleic anhydride copolymer, isobutylene-maleic anhydride alternating copolymer, ethylene-acrylic acid copolymer, and saponified ethylene-ethyl acrylate copolymer. In order to obtain the composite structure that has more excellent barrier properties and hot-water resistance, the polymer (C) is preferably at least one polymer selected from the group consisting of polyvinyl alcohol, ethylene-vinyl alcohol copolymer, a polysaccharide, polyacrylic acid, a salt of polyacrylic acid, polymethacrylic acid, and a salt of polymethacrylic acid.

The molecular weight of the polymer (C) is not particularly limited. In order to obtain the composite structure that has more excellent barrier properties and mechanical characteristics (drop impact resistance etc.), the number average molecular weight of the polymer (C) is preferably 5,000 or more, more preferably 8,000 or more, and even more preferably 10,000 or more. The upper limit of the number average molecular weight of the polymer (C) is not particularly specified, and is, for example, 1,500,000 or less.

In order to further improve the barrier properties, the content of the polymer (C) in the layer (Y) is preferably 50 mass % or less, more preferably 40 mass % or less, and even more preferably 30 mass % or less and may be 20 mass % or less, with respect to the mass of the layer (Y) (defined as 100 mass %). The polymer (C) may or may not react with another constituent in the layer (Y). In the present specification, the polymer (C) having reacted with another constituent is also referred to as a polymer (C). For example, in the case where the polymer (C) is bonded to the aluminum compound (A) and/or a phosphorus atom derived from the phosphorus compound (B), the reaction product is also referred to as a polymer (C). In this case, the above-described content of the polymer (C) is calculated by dividing the mass of the polymer (C) yet to be bonded to the aluminum compound (A) and/or a phosphorus atom by the mass of the layer (Y).

The layer (Y) included in the composite structure may consist only of the reaction product (R) (including a reaction product having a polymer (C)-derived portion) formed by a reaction at least between the aluminum compound (A) and the phosphorus compound (B), may consist only of the reaction product (R) and the unreacted polymer (C), or may further include other substances.

Examples of the other substances include: inorganic acid metal salts such as metal carbonates, metal hydrochlorides, metal nitrates, metal hydrogen carbonates, metal sulfates, metal hydrogen sulfates, and metal borates; organic acid metal salts such as metal oxalates, metal acetates, metal tartrates, and metal stearates; metal complexes such as metal acetylacetonate complexes (aluminum acetylacetonate etc.), cyclopentadienyl metal complexes (titanocene etc.), and cyanometal complexes; layered clay compounds; crosslinking agents; polymer compounds other than the polymer (C); plasticizers; antioxidants; ultraviolet absorbers; and flame retardants.

The content of the other substances in the layer (Y) in the composite structure is preferably 50 mass % or less, more preferably 20 mass % or less, even more preferably 10 mass % or less, and particularly preferably 5 mass % or less, and may be 0 mass % (free from the other substances).

The coating liquid (U) may include, as necessary, at least one acid compound (D) selected from acetic acid, hydrochloric acid, nitric acid, trifluoroacetic acid, and trichloroacetic acid. Hereinafter, the at least one acid compound (D) may be simply abbreviated as the "acid compound (D)". The method for having the acid compound (D) included in the coating liquid (U) is not particularly limited. For example, the acid compound (D) itself may be added to and mixed with the dispersion liquid (S), the solution (T), or a mixed liquid of the dispersion liquid (S) and the solution (T). Alternatively, a solution of the acid compound (D) may be added to and mixed with the dispersion liquid (S), the solution (T), or a mixed liquid of the dispersion liquid (S) and the solution (T). Alternatively, the dispersion liquid (S), the solution (T), or a mixed liquid of the dispersion liquid (S) and the solution (T) may be added to and mixed with a solution of the acid compound (D). When the solution (T) includes the acid compound (D), the rate of reaction between the aluminum compound (A) and the phosphorus compound (B) is slowed at the time of mixing of the dispersion liquid (S) and the solution (T) in the step (II), with the result that the coating liquid (U) that is excellent in temporal stability may be obtained.

In the coating liquid (U) including the acid compound (D), the reaction between the aluminum compound (A) and the phosphorus compound (B) is suppressed. Therefore, precipitation or aggregation of the reaction product in the coating liquid (U) can be suppressed. Thus, the use of the coating liquid (U) including the acid compound (D) improves the appearance of the resultant composite structure in some cases. In addition, the boiling point of the acid compound (D) is 200° C. or less. Therefore, in the production process of the composite structure, the acid compound (D) can easily be removed from the layer (Y), for example, by volatilizing the acid compound (D).

The content of the acid compound (D) in the coating liquid (U) is preferably in the range of 0.1 mass % to 5.0 mass %, and more preferably in the range of 0.5 mass % to 2.0 mass %. When the content is in such ranges, the effect of addition of the acid compound (D) can be obtained, and the removal of the acid compound (D) is easy. In the case where an acid substance remains in the dispersion liquid (S), the amount of the acid compound (D) to be added may be determined in view of the amount of the remaining acid substance.

The liquid itself obtained by the mixing of the dispersion liquid (S) and the solution (T) can be used as the coating liquid (U). In this case, the solvent contained in the dispersion liquid (S) or the solution (T) usually acts as a solvent of the coating liquid (U). The coating liquid (U) may be prepared by performing a process for the liquid obtained by the mixing of the dispersion liquid (S) and the solution (T). For example, a process such as addition of an organic solvent, adjustment of the pH, adjustment of the viscosity, or addition of an additive, may be performed.

As a result of measurement of the particle size of the particles in the coating liquid (U), it has been discovered that there is an association between the particle size and the quality of the resultant composite structure. The particles size is preferably 2000 nm or less, more preferably 1500 nm or less, and even more preferably 1000 nm or less. The particle size more than 2000 nm causes deterioration of the appearance or gas barrier properties, and thus is not preferable. The particle size is preferably 0.6 nm or more.

The particle size of the particles in the coating liquid (U) was measured by a dynamic light scattering method after the coating liquid (U) was diluted with water. The measurement method will be described in detail later in EXAMPLES.

An organic solvent may be added to the liquid obtained by the mixing of the dispersion liquid (S) and the solution (T), to the extent that the stability of the resultant coating liquid (U) is not impaired. In some cases, the addition of the organic solvent makes it easy to apply the coating liquid (U) onto the base (X) in the step (III). The organic solvent is preferably one capable of being uniformly mixed in the resultant coating liquid (U). Preferred examples of the organic solvent include: alcohols such as methanol, ethanol, n-propanol, and isopropanol; ethers such as tetrahydrofuran, dioxane, trioxane, and dimethoxyethane; ketones such as acetone, methyl ethyl ketone, methyl vinyl ketone, and methyl isopropyl ketone; glycols such as ethylene glycol and propylene glycol; glycol derivatives such as methyl cellosolve, ethyl cellosolve, and n-butyl cellosolve; glycerin; acetonitrile; amides such as dimethylformamide and dimethylacetamide; dimethylsulfoxide; and sulfolane.

From the standpoint of the storage stability of the coating liquid (U) and from the standpoint of the performance of the coating liquid (U) in terms of application onto the base, the solid content concentration of the coating liquid (U) is preferably in the range of 1 mass % to 20 mass %, more preferably in the range of 2 mass % to 15 mass %, and even more preferably in the range of 3 mass % to 10 mass %. The solid content concentration of the coating liquid (U) can be calculated, for example, by adding a predetermined amount of the coating liquid (U) onto a laboratory dish, exposing the coating liquid (U) to a temperature of 100° C. together with the laboratory dish to remove volatile components such as the solvent, and dividing the mass of the remaining solid content by the mass of the initially-added coating liquid (U). In that case, it is preferable that the mass of the remaining solid content be measured each time drying is performed for a given period of time, and the solid content concentration be determined using the last-measured mass of the remaining solid content when the difference between the values of the mass obtained by the two successive measurements has reduced to a negligible level.

From the standpoint of the storage stability of the coating liquid (U) and the barrier properties of the composite structure, the pH of the coating liquid (U) is preferably in the range of 0.5 to 6.0, more preferably in the range of 0.5 to 5.0, and even more preferably in the range of 0.5 to 4.0.

The pH of the coating liquid (U) can be adjusted by a commonly-known method, and can be adjusted, for example, by adding an acidic compound or a basic compound. Examples of the acidic compound include hydrochloric acid, nitric acid, sulfuric acid, phosphoric acid, acetic acid, butyric acid, and ammonium sulfate. Examples of the basic compound include sodium hydroxide, potassium hydroxide, ammonia, trimethylamine, pyridine, sodium carbonate, and sodium acetate.

The coating liquid (U) changes in state over time, and tends to be converted finally into a gel composition or to undergo precipitation. The time to occurrence of such change in state depends on the composition of the coating liquid (U). In order to stably apply the coating liquid (U) onto the base (X), the viscosity of the coating liquid (U) is preferably stable over a long time. When the viscosity at the completion of the step (II) is defined as a reference viscosity, it is preferable to prepare the solution (U) so that the viscosity measured by a Brookfield viscometer (B-type viscometer: 60 rpm) be five times or less the reference viscosity even after the solution (U) is allowed to stand at 25° C. for two days. In many cases where the coating liquid (U) has a viscosity within such a range and is excellent in preservation stability, the composite structure that has more excellent barrier properties is obtained.

For example, adjustment of the solid content concentration, adjustment of the pH, or addition of a viscosity modifier can be employed as the method for adjusting the viscosity of the coating liquid (U) to the above range. Examples of the viscosity modifier include carboxymethyl cellulose, starch, bentonite, tragacanth gum, stearic acid salts, alginic acid salts, methanol, ethanol, n-propanol, and isopropanol.

The coating liquid (U) may include another substance other than the above-described substances, as long as the effect of the present invention is obtained. For example, the coating liquid (U) may include: an inorganic acid metal salt such as a metal carbonate, a metal hydrochloride, a metal nitrate, a metal hydrogen carbonate, a metal sulfate, a metal hydrogen sulfate, or a metal borate; an organic acid metal salt such as a metal oxalate, a metal acetate, a metal tartrate, or a metal stearate; a metal complex such as a metal acetylacetonate complex (aluminum acetylacetonate or the like), a cyclopentadienyl metal complex (titanocene or the like), or a cyanometal complex; a layered clay compound; a crosslinking agent; a polymer compound other than the polymer (C); a plasticizer; an antioxidant; an ultraviolet absorber; or a flame retardant.

[Step (III)]

In the step (III), a precursor layer of the layer (Y) is formed on the base (X) by applying the coating liquid (U) onto the base (X). The coating liquid (U) may be applied directly onto at least one surface of the base (X). Alternatively, before application of the coating liquid (U), an adhesive layer (H) may be formed on the surface of the base (X), for example, by treating the surface of the base (X) with a commonly-known anchor coating agent or by applying a commonly-known adhesive agent onto the surface of the base (X).

The coating liquid (U) may be subjected to degassing and/or defoaming as necessary. Examples of the method for degassing and/or defoaming are those using vacuum drawing, heating, centrifugation, ultrasonic waves, etc. A method including vacuum drawing can be preferably used.

The method for applying the coating liquid (U) onto the base (X) is not particularly limited, and a commonly-known method can be employed. Examples of preferred methods include casting, dipping, roll coating, gravure coating, screen printing, reverse coating, spray coating, kiss coating, die coating, metering bar coating, chamber doctor-using coating, and curtain coating.

In the step (III), the precursor layer of the layer (Y) is formed usually by removing the solvent in the coating liquid (U). The method for removing the solvent is not particularly limited, and a commonly-known drying method can be used. Specifically, drying methods such as hot-air drying, heat roll contact drying, infrared heating, and microwave heating can be used alone or in combination. The drying temperature is preferably 0° C. to 15° C. or more lower than the onset temperature of fluidization of the base (X). In the case where the coating liquid (U) includes the polymer (C), the drying temperature is preferably 15° C. to 20° C. or more lower than the onset temperature of pyrolysis of the polymer (C). The drying temperature is preferably in the range of 70° C. to 200° C., more preferably in the range of 80° C. to 180° C., and even more preferably in the range of 90° C. to 160° C. The removal of the solvent may be carried out under ordinary pressure or under reduced pressure. Alternatively, the solvent may be removed by heat treatment in the step (IV) described later.

In the case where the layers (Y) are stacked on both surfaces of the base (X) that is in the form of a layer, a first layer (a precursor layer of a first layer (Y)) may be formed by applying the coating liquid (U) onto one surface of the base (X) and then removing the solvent, and a second layer (a precursor layer of a second layer (Y)) may be subsequently formed by applying the coating liquid (U) onto the other surface of the base (X) and then removing the solvent. The compositions of the coating liquids (U) applied onto the two surfaces may be the same or different.

In the case where the layers (Y) are stacked on a plurality of surfaces of the base (X) that has a three-dimensional shape, a layer (a precursor layer of the layer (Y)) may be formed on each of the surfaces by the above method. Alternatively, a plurality of layers (precursor layers of the layers (Y)) may be simultaneously formed by applying the coating liquid (U) simultaneously onto the plurality of surfaces of the base (X) and drying the coating liquid (U).

[Step (IV)]

In the step (IV), the layer (Y) is formed by subjecting the precursor layer (the precursor layer of the layer (Y)) formed in the step (III) to heat treatment at a temperature of 110° C. or more. Examples of the method for treating the precursor layer include heat treatment and irradiation with an electromagnetic ray such as an ultraviolet ray. The treatment performed in the step (IV) may be a treatment for reacting the aluminum compound (A) and the phosphorus compound (B). For example, the treatment performed in the step (IV) may be a treatment for reacting the aluminum compound (A) and the phosphorus compound (B) so that the particles of the aluminum compound (A) are bonded together via phosphorus atoms derived from the phosphorus compound (B). In an infrared absorption spectrum of the precursor layer, a maximum absorbance ($A^{1'}$) exhibited in the range of 800 cm$^{-1}$ to 1400 cm$^{-1}$ and a maximum absorbance ($A^{2'}$) exhibited in the range of 2500 cm$^{-1}$ to 4000 cm$^{-1}$ due to stretching vibration of hydroxyl groups may satisfy a relation of absorbance ($A^{2'}$)/absorbance ($A^{1'}$)>0.2, although the present invention is not particularly limited by this relation.

In the step (IV), a reaction in which the particles of the aluminum compound (A) are bonded together via phosphorus atoms (phosphorus atoms derived from the phosphorus compound (B)) proceeds. From another standpoint, a reaction in which the reaction product (R) formed by a reaction at least between the aluminum compound (A) and the phosphorus compound (B) is generated proceeds in the step (IV). In order for the reaction to proceed sufficiently, the temperature of the heat treatment is 110° C. or more, preferably 120° C. or more, more preferably 140° C. or more, and even more preferably 170° C. or more. A lowered heat treatment temperature increases the time required to achieve sufficient reaction, and causes reduction in productivity. The preferred upper limit of the heat treatment temperature varies depending on, for example, the type of the base (X). For example, in the case where a thermoplastic resin film made of polyamide resin is used as the base (X), the heat treatment temperature is preferably 190° C. or less. In the case where a thermoplastic resin film made of polyester resin is used as the base (X), the heat treatment temperature is preferably 220° C. or less. The heat treatment can be carried out in air, a nitrogen atmosphere, an argon atmosphere, or the like.

The length of time of the heat treatment is preferably in the range of 0.1 seconds to 1 hour, more preferably in the range of 1 second to 15 minutes, and even more preferably in the range of 5 seconds to 300 seconds. In an example, the heat treatment is performed at 110° C. to 220° C. for 0.1 seconds to 1 hour. In another example, the heat treatment is performed at 120° C. to 200° C. for 5 seconds to 300 seconds (e.g., 60 seconds to 300 seconds).

The method of the present invention for producing the composite structure may include a step of irradiating the layer (Y) or the precursor layer of the layer (Y) with an ultraviolet ray. The ultraviolet irradiation may be performed at any time after the step (III) (e.g., after the removal of the solvent of the applied coating liquid (U) is almost completed). The method of the irradiation is not particularly limited, and a commonly-known method can be employed. The wavelength of the ultraviolet ray for irradiation is preferably in the range of 170 nm to 250 nm, and more preferably in the range of 170 nm to 190 nm and/or 230 nm to 250 nm. Alternatively, irradiation with a radioactive ray such as an electron ray or a γ ray may be performed instead of the ultraviolet irradiation. Performing the ultraviolet irradiation may allow the composite structure to exhibit higher barrier performance.

In the case of treating the surface of the base (X) with a commonly-known anchor coating agent or applying a commonly-known adhesive agent onto the surface of the base (X) before application of the coating liquid (U) in order to dispose the adhesive layer (H) between the base (X) and the layer (Y), aging treatment is preferably performed. Specifically, the base (X) having the coating liquid (U) applied thereto is preferably left at a relatively low temperature for a long time after the application of the coating liquid (U) but before the heat treatment of the step (III). The temperature of the aging treatment is preferably less than 110° C., more preferably 100° C. or less, and even more preferably 90° C. or less. The temperature of the aging treatment is preferably 10° C. or more, more preferably 20° C. or more, and even more preferably 30° C. or more. The length of time of the aging treatment is preferably in the range of 0.5 days to 10 days, more preferably in the range of 1 day to 7 days, and even more preferably in the range of 1 day to 5 days. Performing such aging treatment further enhances the adhesive force between the base (X) and the layer (Y).

The composite structure itself obtained through the heat treatment of the step (IV) can be used as the composite structure of the present invention. However, as described above, another member (another layer or the like) may be further adhered or formed onto the composite structure, and the resultant structure may be used as the composite structure of the present invention. The adhesion of the member can be performed by a commonly-known method.

[Coating Liquid]

The coating liquid of the present invention is the coating liquid (U) described above. That is, the coating liquid of the present invention includes the aluminum compound (A), the phosphorus compound (B), and a solvent. As described above, the coating liquid of the present invention may further include at least one selected from the group consisting of the polymer (C) and the acid compound (D). The layer (Y) can be formed by subjecting a layer formed of the coating liquid (U) of the present invention to heat treatment at a temperature of 110° C. or more.

[Composite Structure]

The composite structure of the present invention can be produced by the production method of the present invention. The matters described for the production method of the present invention can be applied to the composite structure of the present invention, and redundant descriptions are therefore omitted in some cases. In addition, the matters applied to the composite structure of the present invention can be applied to the production method of the present invention.

The composite structure of the present invention has a base (X) and a layer (Y) stacked on the base (X). The layer (Y) in the composite structure includes a reaction product (R). The reaction product (R) is a reaction product formed by a reaction at least between the aluminum compound (A) and the phosphorus compound (B). In an infrared absorption spectrum of the layer (Y) as measured in the range of 800 $cm^{-1}$ to 1400 $cm^{-1}$, a wavenumber ($n^1$) at which maximum infrared absorption occurs is in the range of 1080 $cm^{-1}$ to 1130 $cm^{-1}$. Furthermore, in another embodiment that may include the composite structure, the composite structure is a composite structure having a base (X) and a layer (Y) stacked on the base (X), the layer (Y) including a reaction product (R), the reaction product (R) including a reaction product (r) formed by a reaction between the aluminum compound (A) and the phosphorus compound (B). In an infrared absorption spectrum derived from the reaction product (r), a wavenumber ($n^1$) at which maximum infrared absorption in the range of 800 $cm^{-1}$ to 1400 $cm^{-1}$ occurs is in the range of 1080 $cm^{-1}$ to 1130 $cm^{-1}$.

The wavenumber ($n^1$) may be referred to as the "maximum absorption wavenumber ($n^1$)" hereinafter. The aluminum compound (A) reacts with the phosphorus compound (B) usually in the form of particles of the aluminum compound (A).

In the layer (Y) in the composite structure, the number of moles of metal atoms binding the particles of the aluminum compound (A) together is preferably 0 to 1 time (e.g., 0 to 0.9 times) the number of moles of phosphorus atoms binding the particles of the aluminum compound (A) together. For example, the number of moles of the metal atoms may be 0.3 times or less, 0.05 times or less, 0.01 times or less, or 0 time the number of moles of the phosphorous atoms.

The layer (Y) included in the composite structure of the present invention may partially include the aluminum compound (A) and/or the phosphorus compound (B) that is not involved in the reaction.

The layer (Y) included in the composite structure includes the reaction product (R). The reaction product (R) is a reaction product formed by a reaction at least between the aluminum compound (A) and the phosphorus compound (B). In an infrared absorption spectrum of the layer (Y) as measured in the range of 800 $cm^{-1}$ to 1400 $cm^{-1}$, a wavenumber ($n^1$) at which maximum infrared absorption occurs is in the range of 1080 $cm^{-1}$ to 1130 $cm^{-1}$. Furthermore, in another embodiment that may include the composite structure, the composite structure is a composite structure having a base (X) and a layer (Y) stacked on the base (X), the layer (Y) including a reaction product (R), the reaction product (R) being a reaction product formed by a reaction at least between the aluminum compound (A) and the phosphorus compound (B). In an infrared absorption spectrum of the layer (Y) as measured in the range of 800 $cm^{-1}$ to 1400 $cm^{-1}$, the infrared absorption peak attributed to a bond represented by Al—O—P in which the aluminum atom (Al) that is a constituent of the aluminum compound (A) and the phosphorus atom (P) that is derived from the compound (B) are bonded via an oxygen atom (O) is the highest among all infrared absorption peaks attributed to bonds forming the aluminum compound (A), bonds forming the phosphorus compound (B), and bonds formed by a reaction of the aluminum compound (A) or the phosphorus compound (B) and/or a reaction between the aluminum compound (A) and the phosphorus compound (B). The wavenumber ($n^1$) at which the infrared absorption peak attributed to the bond represented by Al—O—P appears is in the range of 1080 $cm^{-1}$ to 1130 $cm^{-1}$.

In general, when a metal compound and a phosphorus compound react with each other to produce bonds represented by M-O—P in which a metal atom (M) that is a constituent of the metal compound and a phosphorus atom (P) that is derived from the phosphorus compound are bonded via an oxygen atom (O), a characteristic peak occurs in an infrared absorption spectrum. Here, the characteristic peak shows an absorption peak at a particular wavenumber depending on the environment or structure around the bond. As a result of a study by the present inventors, it has been found that excellent barrier properties and hot-water resistance are exhibited in the resultant composite structure when the absorption peak due to the M-O—P bond is located in the range of 1080 $cm^{-1}$ to 1130 $cm^{-1}$. In particular, it has been found that more excellent barrier properties and hot-water resistance are exhibited in the resultant composite structure when the absorption peak appears as an absorption peak at the maximum absorption wavenumber in the region of 800 $cm^{-1}$ to 1400 $cm^{-1}$ where absorptions attributed to bonds between various atoms and oxygen atoms are generally observed.

Although the present invention is not intended to be limited in any respect, it can be thought that when the particles of the aluminum compound (A) are bonded together via phosphorus atoms derived from the phosphorus compound (B) and not via metal atoms not derived from the aluminum compound (A) so as to produce a bond represented by Al—O—P in which the aluminum atom (Al) that is a constituent of the aluminum compound (A) and a phosphorus atom (P) are bonded via an oxygen atom (O), the absorption peak due to the Al—O—P bond in an infrared absorption spectrum of the layer (Y) appears within the range of 1080 $cm^{-1}$ to 1130 $cm^{-1}$ as an absorption peak at the maximum absorption wavenumber in the region of 800 $cm^{-1}$ to 1400 $cm^{-1}$ by virtue of the fact that the bond is produced in a relatively definite environment, i.e., in the surfaces of the particles of the aluminum compound (A).

In terms of obtaining the composite structure that is more excellent in barrier properties and hot-water resistance, the maximum absorption wavenumber ($n^1$) is preferably in the range of 1085 $cm^{-1}$ to 1120 $cm^{-1}$, and more preferably in the range of 1090 $cm^{-1}$ to 1110 $cm^{-1}$.

In an infrared absorption spectrum of the layer (Y) included in the composite structure, absorptions due to stretching vibration of hydroxyl groups bonded to various atoms may be observed in the range of 2500 $cm^{-1}$ to 4000 $cm^{-1}$. Examples of hydroxyl groups exhibiting absorption in this range include: hydroxyl groups present in the surface of the aluminum compound (A) and forming Al—OH; hydroxyl groups bonded to phosphorus atoms (P) derived from the phosphorus compound (B) and forming P—OH; and hydroxyl groups forming C—OH derived from the polymer (C). The amount of the hydroxyl groups present in the layer (Y) can be associated with an absorbance ($A^2$) at a wavenumber ($n^2$) at which the absorption exhibited in the range of 2500 $cm^{-1}$ to 4000 $cm^{-1}$ due to stretching vibration of hydroxyl groups is at maximum. Here, the wavenumber ($n^2$) is a wavenumber at which the infrared absorption due to stretching vibration of hydroxyl groups is at maximum in an infrared absorption spectrum of the layer (Y) as measured in the range of 2500 $cm^{-1}$ to 4000 $cm^{-1}$. The wavenumber ($n^2$) may be referred to as the "maximum absorption wavenumber ($n^2$)" hereinafter.

The larger the amount of the hydroxyl groups present in the layer (Y) is, the greater the tendency for the water vapor barrier properties or hot-water resistance to deteriorate due to the hydroxyl groups serving as transmission paths for water molecules is. In addition, it can be thought that the smaller the ratio [absorbance ($A^2$)/absorbance ($A^1$)] between an absorbance ($A^1$) at the maximum absorption wavenumber ($n^1$) and the absorbance ($A^2$) in an infrared absorption spectrum of the layer (Y) included in the composite structure is, the more effectively the particles of the aluminum compound (A) are bonded together via phosphorus atoms derived from the phosphorus compound (B). Therefore, from the standpoint of allowing the resultant composite structure to exhibit high levels of gas barrier properties and water vapor barrier properties, the ratio [absorbance ($A^2$)/absorbance ($A^1$)] is preferably 0.2 or less, and more preferably 0.1 or less. The composite structure in which the layer (Y) has such a ratio [absorbance ($A^2$)/absorbance ($A^1$)] can be obtained by adjusting, for example, the heat treatment conditions or the later-described ratio between the number of moles ($N_M$) of metal atoms that are constituents of the aluminum compound (A) and the number of moles ($N_P$) of phosphorus atoms derived from the phosphorus compound (B). In an infrared absorption spectrum of the later-described precursor layer of the layer Y, a maximum absorbance ($A^{1'}$) exhibited in the range of 800 $cm^{-1}$ to 1400 $cm^{-1}$ and a maximum absorbance ($A^{2'}$) exhibited in the range of 2500 $cm^{-1}$ to 4000 $cm^{-1}$ due to stretching vibration of hydroxyl groups may satisfy a relation of absorbance ($A^{2'}$)/absorbance ($A^{1'}$)>0.2, although the present invention is not particularly limited by this relation.

In an infrared absorption spectrum of the layer (Y) included in the composite structure, the half width of the absorption peak having a local maximum at the maximum absorption wavenumber ($n^1$) is preferably 200 $cm^{-1}$ or less, more preferably 150 $cm^{-1}$ or less, more preferably 130 $cm^{-1}$ or less, more preferably 110 $cm^{-1}$ or less, even more preferably 100 $cm^{-1}$ or less, and particularly preferably 50 $cm^{-1}$ or less, from the standpoint of the gas barrier properties and water vapor barrier properties of the resultant composite structure. Although the present invention is not intended to be limited in any respect, it can be thought that when the particles of the aluminum compound (A) bonded together via phosphorus atoms are bonded via phosphorous atoms derived from the phosphorus compound (B) and not via metal atoms not derived from the aluminum compound (A) so as to produce a bond represented by M-O—P in which a metal atom (M) that is a constituent of the aluminum compound (A) and a phosphorus atom (P) are bonded via an oxygen atom (O), the half width of the absorption peak having a local maximum at the maximum absorption wavenumber ($n^1$) falls within the above range by virtue of the fact that the bond is produced in a relatively definite environment, i.e., in the surfaces of the particles of the aluminum compound (A). In the present specification, the half width of the absorption peak at the maximum absorption wavenumber ($n^1$) can be obtained by determining wavenumbers at two points in the absorption peak that correspond to an absorbance (absorbance ($A^1$)/2) that is half the absorbance ($A^1$) and by calculating the difference between the two wavenumbers.

The above-described infrared absorption spectrum of the layer (Y) can be obtained by ATR (attenuated total reflection) measurement or by scraping the layer (Y) from the composite structure and then measuring the infrared absorption spectrum of the layer (Y) by KBr method.

[Thickness of Layer (Y)]

The thickness of the layer (Y) included in the composite structure of the present invention (or the total thickness of layers (Y) when the composite structure includes two or more layers (Y)) is preferably 4.0 µm or less, more preferably 2.0 µm or less, even more preferably 1.0 µm or less, and particularly preferably 0.9 µm or less. When the layer (Y) is thin, the dimensional change of the composite structure during a process such as printing and lamination can be kept small, the flexibility of the composite structure is increased, and the mechanical characteristics of the composite structure can be made close to the mechanical characteristics of the base itself. Even in the case where the total thickness of the layer(s) (Y) is 1.0 µm or less (e.g., 0.9 µm or less), the composite structure of the present invention can have a moisture permeability of 5 g/(m$^2$·day) or less under conditions of 40° C. and 90/0% RH (relative humidity), and can have an oxygen transmission rate of 1 ml/(m$^2$·day·atm) or less under conditions of 20° C. and 85% RH (relative humidity). Here, "90/0% RH" means that the relative humidity on one side of the composite structure is 90% and the relative humidity on the other side is 0%. The thickness of the layer (Y) (or the total thickness of layers (Y) when the composite structure includes two or more layers (Y)) is preferably 0.1 µm or more (e.g., 0.2 µm or more). From the standpoint of better barrier properties of the composite structure of the present invention, the thickness of a single layer (Y) is preferably 0.05 µm or more (e.g., 0.15 µm or more). The thickness of the layer (Y) can be controlled by the concentration of the later-described coating liquid (U) used for formation of the layer (Y) or by the method for application of the coating liquid (U).

[Base (X)]

The material of the base (X) included in the composite structure of the present invention is not particularly limited, and a base made of any of various materials can be used. Examples of the material of the base (X) include: resins such as thermoplastic resins and thermosetting resins; fiber assemblies such as fabric and paper; wood; glass; metals; and metal oxides. The base may have a composite configuration made of a plurality of materials or may have a multi-layer configuration.

The form of the base (X) is not particularly limited. The base (X) may be a layer-shaped base such as a film or a sheet, or may be any of various formed bodies having a three-dimensional shape such as a spherical shape, a polygonal shape, or a pipe shape. Among these, a layer-shaped base is useful particularly when the composite structure (layered structure) is used as a packaging material for packaging foods etc.

Examples of the layer-shaped base include a single-layer or multi-layer base including at least one layer selected from the group consisting of a thermoplastic resin film layer, a thermosetting resin film layer, a fiber assembly sheet layer (a fabric layer, paper layer, or the like), a wood sheet layer, a glass layer, an inorganic deposited layer, and a metal foil layer. Among these, a base including at least one layer selected from the group consisting of a thermoplastic resin film layer, a paper layer, and an inorganic deposited layer is preferable. Such a base may be a single-layer base or a multi-layer base. The composite structure (layered structure) that uses such a base is excellent in processability into a packaging material and various characteristics required for use as a packaging material.

Examples of the thermoplastic resin film for forming the thermoplastic resin film layer may include films obtained by subjecting the following thermoplastic resins to forming processes: polyolefin resins such as polyethylene and polypropylene; polyester resins such as polyethylene terephthalate, polyethylene-2,6-naphthalate, polybutylene terephthalate, and copolymers thereof, polyamide resins such as nylon-6, nylon-66, and nylon-12; hydroxyl group-containing polymers such as polyvinyl alcohol and ethylene-vinyl alcohol copolymer; polystyrene; poly(meth)acrylic acid ester; polyacrylonitrile; polyvinyl acetate; polycarbonate; polyarylate; regenerated cellulose; polyimide; polyetherimide; polysulfone; polyethersulfone; polyetheretherketone; and ionomer resins. As the base of the layered body used in a packaging material for packaging foods etc., a film made of polyethylene, polypropylene, polyethylene terephthalate, nylon-6, or nylon-66 is preferable. For uses other than use in a packaging material, polymethyl (meth)acrylate, methyl (meth)acrylate/styrene copolymer, syndiotactic polystyrene, cyclic polyolefin, cyclic olefin copolymer, polyacetylcellulose, polyethylene naphthalate, polyvinyl acetal, polyvinyl butyral, polyvinyl chloride, polymethylpentene and the like, are also preferable as well as the above-mentioned thermoplastic resins for forming the thermoplastic film layer.

The thermoplastic resin film may be an oriented film or a non-oriented film. In terms of excellent suitability for processes (such as printing and lamination) of the resultant composite structure, an oriented film, particularly a biaxially-oriented film, is preferable. The biaxially-oriented film may be a biaxially-oriented film produced by any of a simultaneous biaxial orientation method, a sequential biaxial orientation method, and a tubular orientation method.

Examples of the paper used in the paper layer include kraft paper, high-quality paper, simili paper, glassine paper, parchment paper, synthetic paper, white paperboard, manila board, milk carton board, cup paper, and ivory paper. A layered structure for a paper container can be obtained by use of the base that includes the paper layer.

The inorganic deposited layer is preferably one having barrier properties against oxygen gas and water vapor. A layer having transparency or a layer having light shielding properties as typified by a deposited layer of metal such as aluminum can be used as the inorganic deposited layer as appropriate. The inorganic deposited layer can be formed by vapor-depositing an inorganic substance onto a substrate, and the whole layered body including the substrate and the inorganic deposited layer formed on the substrate can be used as the base (X) that has a multi-layer configuration. Examples of an inorganic deposited layer having transparency include: a layer formed of an inorganic oxide such as aluminum oxide, silicon oxide, silicon oxynitride, magnesium oxide, tin oxide, or a mixture thereof; a layer formed of an inorganic nitride such as silicon nitride or silicon carbonitride; and a layer formed of an inorganic carbide such as silicon carbide. Among these, a layer formed of aluminum oxide, silicon oxide, magnesium oxide, or silicon nitride is preferable from the standpoint of excellent barrier properties against oxygen gas and water vapor.

The preferred thickness of the inorganic deposited layer varies depending on the types of the constituents of the inorganic deposited layer, but is usually in the range of 2 nm to 500 nm. A thickness that allows good barrier properties and mechanical properties of the composite structure may be selected within the range. When the thickness of the inorganic deposited layer is less than 2 nm, there is a tendency that the repeatability of exhibition of the barrier properties of the inorganic deposited layer against oxygen gas and water vapor is reduced, and there may also be a case where the inorganic deposited layer does not exhibit sufficient barrier properties. When the thickness of the inorganic deposited layer is more than 500 nm, there is a tendency that the barrier properties of the inorganic deposited layer are likely to be deteriorated as a result of the composite structure being pulled or bent. The thickness of the inorganic deposited layer is more preferably in the range of 5 nm to 200 nm, and even more preferably in the range of 10 nm to 100 nm.

Examples of the method for forming the inorganic deposited layer may include vacuum deposition, sputtering, ion plating, and chemical vapor deposition (CVD). Among these, vacuum deposition is preferable from the standpoint of productivity. A heating technique used for vacuum deposition is preferably any of an electron beam heating technique, a resistive heating technique, and an induction heating technique. In order to improve the denseness of the inorganic deposited layer and the adhesiveness to the substrate on which the inorganic deposited layer is formed, the deposition may be performed by employing plasma-assisted deposition or ion beam-assisted deposition. In order to increase the transparency of the inorganic deposited layer, reactive deposition in which a reaction is caused by blowing oxygen gas or the like may be employed for the deposition.

In the case where the base (X) is in the form of a layer, the thickness of the base (X) is preferably in the range of 1 μm to 200 μm, more preferably in the range of 5 μm to 100 μm, and even more preferably in the range of 7 μm to 60 μm, from the standpoint of good mechanical strength and processability of the resultant composite structure.

[Adhesive Layer (H)]

In the composite structure of the present invention, the layer (Y) may be stacked in direct contact with the base (X). Alternatively, the layer (Y) may be stacked on the base (X) with an adhesive layer (H) interposed between the base (X) and the layer (Y). With this configuration, the adhesion between the base (X) and the layer (Y) can be enhanced in some cases. The adhesive layer (H) may be formed of an adhesive resin. The adhesive layer (H) made of an adhesive resin can be formed by treating the surface of the base (X) with a commonly-known anchor coating agent or by applying a commonly-known adhesive agent onto the surface of the base (X). As the adhesive agent, a two-component reactive polyurethane adhesive agent prepared by mixing and reacting a polyisocyanate component and a polyol component is preferable. There may be a case where the adhesion can be further enhanced by adding a small amount of additive such as a commonly-known silane coupling agent into the anchor coating agent or the adhesive agent. Suitable examples of the silane coupling agent include a silane coupling agent having a reactive group such as an isocyanate group, an epoxy group, an amino group, a ureido group, or a mercapto group. Strong adhesion between the base (X) and the layer (Y) via the adhesive layer (H) makes it possible to more effectively suppress deterioration of the barrier properties and appearance of the composite structure of the present invention when the composite structure is subjected to a process such as printing or lamination.

Increasing the thickness of the adhesive layer (H) can enhance the strength of the composite structure of the present invention. However, when the adhesive layer (H) is too thick, the appearance tends to be deteriorated. The thickness of the adhesive layer (H) is preferably in the range of 0.03 μm to 0.18 μm. With this configuration, deterioration of the barrier properties and appearance of the composite structure of the present invention can be suppressed more effectively when the composite structure is subjected to a process such as printing or lamination. Furthermore, the drop impact resistance of a packaging material using the composite structure of the present invention can be enhanced. The thickness of the adhesive layer (H) is more preferably in the range of 0.04 μm to 0.14 μm, and even more preferably in the range of 0.05 μm to 0.10 μm.

[Configuration of Composite Structure]

The composite structure (layered body) of the present invention may consist only of the base (X) and the layer (Y) or may consist only of the base (X), the layer (Y), and the adhesive layer (H). The composite structure of the present invention may include a plurality of layers (Y). The composite structure of the present invention may further include another member (e.g., another layer such as a thermoplastic resin film layer, a paper layer, or an inorganic deposited layer) other than the base (X), the layer (Y), and the adhesive layer (H). The composite structure of the present invention that has such another member (another layer or the like) can be produced by stacking the layer (Y) onto the base (X) directly or with the adhesive layer (H) interposed therebetween, and then by forming or adhering the other member (another layer or the like) onto the laminate directly or with an adhesive layer interposed therebetween. By having such another member (another layer or the like) included in the composite structure, the characteristics of the composite structure can be improved or additional characteristics can be imparted to the composite structure. For example, heat-sealing properties can be imparted to the composite structure of the present invention, or the barrier properties or mechanical properties can be further improved.

In particular, by forming a layer of a polyolefin as an outermost layer of the composite structure of the present invention, heat-sealing properties can be imparted to the composite structure, or the mechanical characteristics of the composite structure can be improved. From the standpoint of, for example, heat-sealing properties or improvement in mechanical characteristics, the polyolefin is preferably polypropylene or polyethylene. In addition, in order to improve the mechanical characteristics of the composite structure, at least one film selected from the group consisting of a film made of a polyester, a film made of a polyamide, and a film made of a hydroxyl group-containing polymer is preferably stacked as another layer. From the standpoint of improvement in mechanical characteristics, polyethylene terephthalate (PET) is preferable as the polyester, nylon-6 is preferable as the polyamide, and ethylene-vinyl alcohol copolymer is preferable as the hydroxyl group-containing polymer. Between the layers, an anchor coat layer or a layer made of an adhesive agent may be provided as necessary.

The composite structure of the present invention may include a surface protective layer disposed on one or both surfaces of the composite structure. A layer made of a scratch-resistant resin is preferable as the surface protective layer. The surface protective layer of a device such as a solar cell which may be used outdoors is preferably made of a resin having high weather resistance (e.g., light resistance). In the case of protecting a surface through which light needs to be transmitted, the surface protective layer preferably has high light transmissivity. Examples of the material of the surface protective layer (surface protective film) include acrylic resin, polycarbonate, polyethylene terephthalate, polyethylene naphthalate, ethylene-tetrafluoroethylene copolymer, polytetrafluoroethylene, tetrafluoroethylene-perchloroalkoxy copolymer, tetrafluoroethylene-hexafluoropropylene copolymer, difluoroethylene-tetrafluoroethylene copolymer, polychlorotrifluoroethylene, polyvinylidene fluoride, and polyvinyl fluoride. In an example, the composite structure includes an acrylic resin layer disposed on one surface thereof. Any of various additives (e.g., an ultraviolet absorber) may be added to the surface protective layer in order to enhance the durability of the surface protective layer. A preferred example of the surface protective layer that has high weather resistance is an acrylic resin layer having an ultraviolet absorber added thereto. Examples of the ultraviolet absorber include commonly-known ultraviolet absorbers, and specifically include benzotriazole-based, benzophenone-based, salicylate-based, cyanoacrylate-based, nickel-based, and triazine-based ultraviolet absorbers. Furthermore, a stabilizer, a light stabilizer, an antioxidant, or the like, may be additionally used.

The surface protective layer is stacked on a layered film (which may be referred to as a "barrier film" hereinafter) of the base and the multi-layer barrier film. The method for stacking the surface protective layer on the barrier film is not limited. For example, the surface protective layer and the barrier film may be adhered together using an adhesive layer. The adhesive layer can be selected depending on the type of the surface protective layer. For example, in the case where the surface protective layer is an acrylic resin film, polyvinyl acetal (e.g., polyvinyl butyral) may be used for the adhesive layer. In this case, the barrier film and the surface protective layer can be thermally-laminated with the adhesive layer interposed therebetween.

The composite structure of the present invention can be formed also by stacking together at least one layer (Y) and at least another layer (including the base). Examples of the other layer include a polyester layer, a polyamide layer, a polyolefin layer (which may be a pigment-containing polyolefin layer, a heat-resistant polyolefin layer, or a biaxially-oriented heat-resistant polyolefin layer), a hydroxyl group-containing polymer layer (e.g., an ethylene-vinyl alcohol copolymer layer), a paper layer, an inorganic deposited film layer, a thermoplastic elastomer layer, and an adhesive layer. The number of these other layers, the number of the layers (Y), and the stacking order are not particularly limited as long as the composite structure includes the base and the layer (Y). The other layers may each be replaced by a formed body (formed body having a three-dimensional shape) that is made of the same material as the layer.

Specific examples of the configuration of the composite structure of the present invention are listed below. In the specific examples listed below, each of the layers may be replaced by a formed body (formed body having a three-dimensional shape) that is made of the same material as the layer. Although the composite structure may have an adhesive layer as exemplified by the adhesive layer (H), such an adhesive layer is omitted for the specific examples listed below.

(1) Layer (Y)/polyester layer,
(2) Layer (Y)/polyester layer/layer (Y),
(3) Layer (Y)/polyamide layer,
(4) Layer (Y)/polyamide layer/layer (Y),
(5) Layer (Y)/polyolefin layer,
(6) Layer (Y)/polyolefin layer/layer (Y),
(7) Layer (Y)/hydroxyl group-containing polymer layer,
(8) Layer (Y)/hydroxyl group-containing polymer layer/layer (Y),
(9) Layer (Y)/paper layer,
(10) Layer (Y)/paper layer/layer (Y),
(11) Layer (Y)/inorganic deposited film layer/polyester layer,
(12) Layer (Y)/inorganic deposited film layer/polyamide layer,
(13) Layer (Y)/inorganic deposited film layer/polyolefin layer,
(14) Layer (Y)/inorganic deposited film layer/hydroxyl group-containing polymer layer,
(15) Layer (Y)/polyester layer/polyamide layer/polyolefin layer,
(16) Layer (Y)/polyester layer/layer (Y)/polyamide layer/polyolefin layer,
(17) Polyester layer/layer (Y)/polyamide layer/polyolefin layer,
(18) Layer (Y)/polyamide layer/polyester layer/polyolefin layer,
(19) Layer (Y)/polyamide layer/layer (Y)/polyester layer/polyolefin layer,
(20) Polyamide layer/layer (Y)/polyester layer/polyolefin layer,
(21) Layer (Y)/polyolefin layer/polyamide layer/polyolefin layer,
(22) Layer (Y)/polyolefin layer/layer (Y)/polyamide layer/polyolefin layer,
(23) Polyolefin layer/layer (Y)/polyamide layer/polyolefin layer,
(24) Layer (Y)/polyolefin layer/polyolefin layer,
(25) Layer (Y)/polyolefin layer/layer (Y)/polyolefin layer,
(26) Polyolefin layer/layer (Y)/polyolefin layer,
(27) Layer (Y)/polyester layer/polyolefin layer,
(28) Layer (Y)/polyester layer/layer (Y)/polyolefin layer,
(29) Polyester layer/layer (Y)/polyolefin layer,
(30) Layer (Y)/polyamide layer/polyolefin layer,
(31) Layer (Y)/polyamide layer/layer (Y)/polyolefin layer,
(32) Polyamide layer/layer (Y)/polyolefin layer,
(33) Layer (Y)/polyester layer/paper layer,
(34) Layer (Y)/polyamide layer/paper layer,
(35) Layer (Y)/polyolefin layer/paper layer,
(36) Polyolefin layer/paper layer/polyolefin layer/layer (Y)/polyester layer/polyolefin layer,
(37) Polyolefin layer/paper layer/polyolefin layer/layer (Y)/polyamide layer/polyolefin layer,
(38) Polyolefin layer/paper layer/polyolefin layer/layer (Y)/polyolefin layer,
(39) Paper layer/polyolefin layer/layer (Y)/polyester layer/polyolefin layer,
(40) Polyolefin layer/paper layer/layer (Y)/polyolefin layer,
(41) Paper layer/layer (Y)/polyester layer/polyolefin layer,
(42) Paper layer/layer (Y)/polyolefin layer,
(43) Layer (Y)/paper layer/polyolefin layer,
(44) Layer (Y)/polyester layer/paper layer/polyolefin layer,
(45) Polyolefin layer/paper layer/polyolefin layer/layer (Y)/polyolefin layer/hydroxyl group-containing polymer layer,
(46) Polyolefin layer/paper layer/polyolefin layer/layer (Y)/polyolefin layer/polyamide layer,
(47) Polyolefin layer/paper layer/polyolefin layer/layer (Y)/polyolefin layer/polyester layer.

According to the present invention, a composite structure that possesses at least one of the features listed below can be obtained. In a preferred example, the composite structure in which the thickness of the layer (Y) (or the total thickness of layers (Y) when the composite structure includes two or more layers (Y)) is 1.0 µm or less (e.g., 0.9 µm or less, 0.8 µm or less, or 0.5 µm or less) possesses at least one of the features listed below.

(Feature 1) The moisture permeability under conditions of 40° C. and 90/0% RH is 5 g/(m²·day) or less.

(Feature 2) The oxygen transmission rate under conditions of 20° C. and 85% RH is 1 ml/(m²·day·atm) or less.

(Feature 3) The moisture permeability as measured under conditions of 40° C. and 90/0% RH after immersion in 120° C. hot water for 30 minutes is not more than twice the moisture permeability as measured under conditions of 40° C. and 90/0% RH before the immersion.

(Feature 4) The oxygen transmission rate as measured under conditions of 20° C. and 85% RH after immersion in 120° C. hot water for 30 minutes is not more than twice the oxygen transmission rate as measured under conditions of 20° C. and 85% RH before the immersion.

[Uses]

The composite structure of the present invention is excellent in both gas barrier properties and water vapor barrier properties, and can maintain both of the barrier properties at high levels even after a bending process. In addition, according to the present invention, a composite structure excellent in appearance can be obtained. Therefore, the present invention of the composite structure can be applied to various uses. The composite structure of the present invention is particularly preferably used as a packaging material. Examples of uses other than use as a packaging material include uses as the following: an electronic device-related film such as a substrate film for LCDs, a substrate film for organic EL devices, a substrate film for electronic paper, a sealing film for electronic devices, a film for PDPs, a film for LEDs, a film for IC tags, a back sheet for solar cells, and a protective film for solar cells; a member for optical communication; a flexible film for electronic equipment; a barrier membrane for fuel cells; a sealing film for fuel cells; and a substrate film for various functional films.

The composite structure of the present invention can be used as an alternative to glass for protecting the surface of a solar cell. That is, the use of the composite structure of the present invention makes it possible to avoid using a thick glass substrate having substantially no flexibility. However, the composite structure of the present invention may be used in a solar cell that includes a thick glass substrate.

A solar cell of the present invention can be obtained by fixing a protective film of the present invention to a predetermined surface of a solar cell. The method for fixing the protective film is not particularly limited. The protective film may be fixed by a commonly-known method, and may be fixed (adhered) using, for example, an adhesive layer such as an OCA (OPTICAL CLEAR ADHESIVE). Specifically, layer stacking may be performed using a separate adhesive layer from the protective film or using a protective film that includes an adhesive layer. The adhesive layer is not particularly limited. A commonly-known adhesive layer or the above-described adhesive layer may be used. Examples of the adhesive layer include a film functioning as an adhesive layer.

The solar cell for which the composite layered body of the present invention is used is not particularly limited. Examples of the solar cell include a silicon solar cell, a compound semiconductor solar cell, and an organic solar cell. Examples of the silicon solar cell include a monocrystalline silicon solar cell, a polycrystalline silicon solar cell, and an amorphous silicon solar cell. Examples of the compound semiconductor solar cell include a group III-V compound semiconductor solar cell, a group II-VI compound semiconductor solar cell, and a group compound semiconductor solar cell. The solar cell may or may not be an integrated solar cell having a plurality of unit cells connected in series.

The packaging material can be applied to various uses, and is preferable for uses in which barrier properties against oxygen or water vapor are required and for uses in which the air inside the packaging material is replaced by any of various functional gases. For example, the packaging material of the present invention is used preferably as a food packaging material. When used as a food packaging material, the packaging material of the present invention is suitably used particularly in a form having a fold line, such as in the form of a stand-up pouch. In addition, the packaging material of the present invention can be used preferably not only as a food packaging material but also as a packaging material for packaging chemicals such as agrochemicals and pharmaceuticals, medical devices, industrial materials such as machinery components and delicate materials, and garments.

A formed product of the present invention is formed using the packaging material of the present invention. The formed product of the present invention may be a vertical form fill seal pouch, a vacuum packaging pouch, a spout pouch, a laminated tube container, an infusion bag, a container cover, a paper container, or a vacuum insulator. The formed product of the present invention may also be a formed product other than a vacuum insulator.

Heat sealing is performed for the formed product (e.g., a vertical form fill seal pouch or the like) of the present invention. In the case where heat sealing is performed, it is usually necessary to dispose a heat-sealable layer on a side corresponding to the inner side of the formed product or on both sides corresponding to the inner side and outer side of the formed product. When the heat-sealable layer is provided only on a side corresponding to the inner side of the formed product (pouch), the body portion of the formed product is usually sealed with a fin seal. When the heat-sealable layer is provided on both sides corresponding to the inner side and outer side of the formed product, the body portion is usually sealed with a lap seal. A polyolefin layer (which may be referred to as a "PO layer" hereinafter) is preferable as the heat-sealable layer.

For example, the formed product of the present invention may be a vertical form fill seal pouch for packaging foods or beverages in the form of liquid, viscous body, powder, solid block, or mixture thereof. The vertical form fill seal pouch of the present invention is excellent in gas barrier properties and water vapor barrier properties, and undergoes less deterioration of the gas barrier properties and water vapor barrier properties even after a bending process. Therefore, with the vertical form fill seal pouch, quality degradation of the packaged article can be suppressed over a long period of time.

Hereinafter, a multi-layer film including the base (X) and the layer (Y) stacked on the base (X) may be referred to as a multi-layer barrier film. This multi-layer barrier film is also one type of the composite structure of the present invention. Layers for imparting various characteristics (e.g., heat sealing properties) may be stacked on the multi-layer barrier film. For example, the composite structure of the present invention may have a configuration of multi-layer barrier film/adhesive layer/polyolefin layer or a configuration of polyolefin layer/adhesive layer/multi-layer barrier film/adhesive layer/polyolefin layer. That is, the composite structure of the present invention may include a polyolefin layer disposed on one of the outermost surfaces. In addition, the composite structure of the present invention may include a first polyolefin layer disposed on one of the outermost surfaces and a second polyolefin layer disposed on the other outermost surface. The first polyolefin layer and the second polyolefin layer may be the same or different.

The vertical form fill seal pouch may be formed by stacking together at least one multi-layer barrier film and at least another layer. Examples of the other layer include a polyester layer, a polyamide layer, a polyolefin layer, a paper layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the composite structure for a vertical form fill seal pouch include a configuration of multi-layer barrier film/polyamide layer/PO layer, a configuration of multi-layer barrier film/PO layer, and a configuration of PO layer/multi-layer barrier film/PO layer. In these configurations, for example, a polyamide film can be used as the base of the multi-layer barrier film. The vertical form fill seal pouch is excellent particularly in the gas barrier properties and water vapor barrier properties exhibited after pouch formation, after heat sterilization, and after heat sterilization/transportation. Adhesive layers may be provided between the layers constituting the vertical form fill seal pouch. In the case where the layer (Y) of the composite structure of the present invention lies on one surface of the base, the layer (Y) may face either outwardly or inwardly of the vertical form fill seal pouch.

The formed product of the present invention may be a vacuum packaging pouch for packaging solid-containing foods etc. The vacuum packaging pouch is excellent in gas barrier properties and water vapor barrier properties, and undergoes less deterioration of the gas barrier properties and water vapor barrier properties even after a bending process. Therefore, in the vacuum packaging pouch, there is little deterioration of the gas barrier properties and water vapor barrier properties caused by deformation during vacuum packaging and heat sterilization. The vacuum packaging pouch is flexible, and closely adheres to solid-containing foods easily, so that degassing at the time of vacuum packaging is easy. Therefore, the vacuum packaging pouch allows reduction in the amount of residual oxygen in the vacuum packaging pouch, and is excellent in long-term food storage performance. In addition, since angulated portions or creased portions are less likely to be formed after vacuum packaging, defects such as pin holes and cracks are less likely to occur. Furthermore, the vacuum packaging pouch can suppress the occurrence of pin holes due to friction between the vacuum packaging pouches or between the vacuum packaging pouch and a cardboard. Moreover, since the vacuum packaging pouch is excellent in gas barrier properties and water vapor barrier properties, the vacuum packaging pouch can suppress quality degradation of the packaged article (e.g., a food) over a long period of time.

The vacuum packaging pouch may be formed by stacking together at least one multi-layer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the composite structure for a vacuum packaging pouch include a configuration of multi-layer barrier film/polyamide layer/PO layer and a configuration of polyamide layer/multi-layer barrier film/PO layer. In these configurations, for example, a polyamide film can be used as the base of the multi-layer barrier film. The vacuum packaging pouch using such a composite structure is excellent particularly in the gas barrier properties exhibited after vacuum packaging or after vacuum packaging and heat sterilization. Adhesive layers may be provided between the above layers. In the case where the layer (Y) is stacked only on one surface of the base, the layer (Y) may be located outwardly or inwardly of the base in the vacuum packaging material.

The formed product of the present invention may be a spout pouch for packaging various liquid substances. The spout pouch can be used as a container for liquid drinks (e.g., soft drinks), jelly drinks, yogurts, fruit sauces, seasoning agents, functional water, liquid foods, etc. Also, the spout pouch can be preferably used as a container for liquid medical products such as amino acid infusions, electrolyte infusions, carbohydrate infusions, and fat emulsions for infusions. The spout pouch is excellent in gas barrier properties and water vapor barrier properties, and undergoes less deterioration of the gas barrier properties and water vapor barrier properties even after a bending process. Therefore, the use of the spout pouch makes it possible to prevent the packaged article from being altered by oxygen after transportation and after long-term storage. In addition, since the spout pouch has good transparency, it is easy to identify the packaged article or to check for alteration of the packaged article caused by degradation.

The spout pouch may be formed by stacking together at least one multi-layer barrier film and at least another layer. Examples of the other layer include a polyester layer, a polyamide layer, a polyolefin layer, an inorganic deposited film layer, an EVOH layer, and an adhesive layer. The number and stacking order of these layers are not particularly limited. In the case where heat sealing is performed, a configuration adapted for that purpose is employed.

Particularly preferred configurations of the composite structure for a spout pouch include a configuration of multi-layer barrier film/polyamide layer/PO layer and a configuration of a polyamide layer/multi-layer barrier film/PO layer. Adhesive layers may be provided between the above layers. In the case where the layer (Y) is stacked only on one surface of the base, the gas barrier layer may be located outwardly or inwardly of the base in the spout pouch.

The formed product of the present invention may be a laminated tube container for packaging cosmetics, chemicals, medical products, foods, dentifrices, etc. The laminated tube container is excellent in gas barrier properties and water vapor barrier properties, undergoes less deterioration of the gas barrier properties and water vapor barrier properties even after a bending process, and maintains the excellent gas barrier properties and water vapor barrier properties even after being squeezed in use. In addition, since the laminated tube container has good transparency, it is easy to identify the packaged article or to check for alteration of the packaged article caused by degradation.

The laminated tube container may be formed by stacking together at least one multi-layer barrier film and at least another layer. Examples of the other layer include a polyamide layer, a polyolefin layer (which may be a pigment-containing polyolefin layer), an inorganic deposited film layer, an EVOH layer, and an adhesive layer. The number and stacking order of these layers are not particularly limited. In the case where heat sealing is performed, a configuration adapted for that purpose is employed.

Particularly preferred configurations for a laminated tube container include a configuration of PO layer/multi-layer barrier film/PO layer and a configuration of PO layer/pigment-containing PO layer/PO layer/multi-layer barrier film/PO layer. Adhesive layers may be disposed between the above layers. In the case where the layer (Y) is stacked only on one surface of the base, the gas barrier layer may be located outwardly or inwardly of the base in the laminated tube container.

The formed product of the present invention may be an infusion bag, and may be, for example, an infusion bag to be filled with a liquid medical product such as an amino acid infusion, an electrolyte infusion, a carbohydrate infusion, or a fat emulsion for infusions. The infusion bag is excellent in gas barrier properties and water vapor barrier properties, and undergoes less deterioration of the gas barrier properties and water vapor barrier properties even after a bending process. Therefore, with the infusion bag, it is possible to prevent the packed liquid medical product from being altered by oxygen before heat sterilization, during heat sterilization, after heat sterilization, after transportation, and after storage.

The infusion bag may be formed by stacking together at least one multi-layer barrier film and at least another layer. Examples of the other layer include a polyamide layer, a polyolefin layer, an inorganic deposited film layer, an EVOH layer, a thermoplastic elastomer layer, and an adhesive layer. The number and stacking order of these layers are not particularly limited. In the case where heat sealing is performed, a configuration adapted for that purpose is employed.

Particularly preferred configurations of the composite structure for a container cover include a configuration of multi-layer barrier film/polyamide layer/PO layer and a configuration of multi-layer barrier film/PO layer. In these configurations, for example, a polyamide film can be used as the base of the multi-layer barrier film. The cover having such a configuration is excellent particularly in the gas barrier properties exhibited after heat sterilization or after heat sterilization/transportation. Adhesive layers may be provided between the above layers. In the case where the layer (Y) of the composite structure lies on one surface of the base, the layer (Y) may be located inwardly of the base (on the container-side) or outwardly of the base.

The formed product of the present invention may be a paper container. The paper container undergoes less deterioration of the gas barrier properties and water vapor barrier properties even when subjected to bending processing. The paper container is used preferably as a window container by virtue of the good transparency of the layer (Y). Furthermore, the paper container is suitable for heating by a microwave oven.

The paper container may be formed by stacking together at least one multi-layer barrier film and at least another layer. Examples of the other layer include a polyester layer, a polyamide layer, a polyolefin layer (which may be a heat-resistant polyolefin layer or a biaxially-oriented heat-resistant polyolefin layer), an inorganic deposited film layer, a hydroxyl group-containing polymer layer, a paper layer, and an adhesive layer. The number and stacking order of these layers are not particularly limited. In the case where heat sealing is performed, a configuration adapted for that purpose is employed.

Particularly preferred configurations of the composite structure for a paper container include a configuration of heat-resistant polyolefin layer/paper layer/heat-resistant polyolefin layer/multi-layer barrier film/heat-resistant polyolefin layer. Adhesive layers may be disposed between the above layers. In the above example, the heat-resistant polyolefin layers are composed of, for example, either a biaxially-oriented heat-resistant polyolefin film or a non-oriented heat-resistant polyolefin film. From the standpoint of ease of a forming process, the heat-resistant polyolefin layers disposed as the outermost layers of the composite structure are preferably non-oriented polypropylene films. Similarly, the heat-resistant polyolefin layer disposed inwardly of the outermost layers of the composite structure is preferably a non-oriented polypropylene film. In a preferred example, all the heat-resistant polyolefin layers included in the composite structure are non-oriented polypropylene films.

The formed product of the present invention may be a vacuum insulator applicable to various uses in which coldness or warmth needs to be kept. The vacuum insulator can maintain heat insulating effect over a long period of time, and thus can be used, for example, in the following: a heat insulating material for home electric appliances such as refrigerators, hot-water supply systems, and rice cookers; a residential heat insulating material used in walls, ceilings, attics, floors, etc.; a vehicle roof material; and an insulating panel of automatic vending machines etc.

The vacuum insulator may be formed by stacking together at least one multi-layer barrier film and at least another layer. Examples of the other layer include a polyester layer, a polyamide layer, a polyolefin layer, and an adhesive layer. The number and stacking order of these layers are not particularly limited. In the case where heat sealing is performed, a configuration adapted for that purpose is employed.

Particularly preferred configurations of the composite structure for a vacuum insulator include a configuration of multi-layer barrier film/polyamide layer/PO layer and a configuration of polyamide layer/multi-layer barrier film/PO layer. Adhesive layers may be provided between the above layers. In the case where the layer (Y) is stacked only on one surface of the base, the gas barrier layer may be located outwardly or inwardly of the base in the vacuum insulator.

Preferred examples of the configuration of the composite structure that is particularly preferable for a protective film of a solar cell are listed below. Although the composite structure may have the adhesive layer (H) between the base and the barrier layer, the adhesive layer (H) is omitted for the specific examples listed below.

(1) Barrier layer/base/barrier layer
(2) Base/barrier layer/adhesive layer/surface protective layer
(3) Barrier layer/base/barrier layer/adhesive layer/surface protective layer In preferred examples of the above configurations (1) to (3), the base is a polyethylene terephthalate film or a polycarbonate film. In preferred examples of the above configurations (2) and (3), the adhesive layer is made of polyvinyl acetal (e.g., polyvinyl butyral), and the surface protective layer is an acrylic resin layer. Furthermore, in other preferred examples of the above configurations (2) and (3), the adhesive layer is made of polyurethane, and the surface protective layer is made of ethylene-tetrafluoroethylene copolymer. The above configurations (2) and (3) are preferable for a protective film of a solar cell.

EXAMPLES

Hereinafter, the present invention will be described more specifically with reference to examples. However, the present invention is not limited in any respect by the examples given below. The measurements and evaluations in the examples and comparative examples were carried out by the methods (1) to (7) described below.

(1) Infrared Absorption Spectrum of Layer (Y) (or Layer (Y'))

Infrared absorption spectra of the layers (Y) formed in the examples and infrared absorption spectra of the layers (Y') formed in the comparative examples were measured by the method described below.

First, for a composite structure in which an oriented polyethylene terephthalate film (PET) was used as a base, the infrared absorption spectrum of the layer (Y) (or layer (Y')) was measured using a Fourier transform infrared spectrophotometer ("Spectrum One" manufactured by PerkinElmer Inc.). The infrared absorption spectrum was measured in the range of 700 $cm^{-1}$ to 4000 $cm^{-1}$ in ATR (attenuated total reflectance) mode. In some cases where the thickness of the layer (Y) (or layer (Y')) is 1 μm or less, an absorption peak attributed to the base (X) is detected in an infrared absorption spectrum obtained by the ATR method, and the absorption intensity attributed only to the layer (Y) (or layer (Y')) cannot be determined accurately. In such a case, the infrared absorption spectrum of the base (X) alone was measured separately, and was subtracted to extract only the peak attributed to the layer (Y) (or layer (Y')). The same measurement as above was performed also for composite structures in which other bases (an oriented nylon film and the like) than the PET film were used.

Based on the thus-obtained infrared absorption spectrum of the layer (Y) (or layer (Y')), the maximum absorption wavenumber ($n^1$) in the range of 800 $cm^{-1}$ to 1400 $cm^{-1}$ and the absorbance ($A^1$) at the maximum absorption wavenumber ($n^1$) were determined. In addition, the maximum absorption wavenumber ($n^2$) at which the absorption due to stretching vibration of hydroxyl groups is at maximum in the range of 2500 $cm^{-1}$ to 4000 $cm^{-1}$, and the absorbance ($A^2$) at the maximum absorption wavenumber ($n^2$), were determined. In addition, the half width of the absorption peak at the maximum absorption wavenumber ($n^1$) was obtained by determining wavenumbers at two points in the absorption peak that corresponded to an absorbance (absorbance ($A^1$)/ 2) that was half the absorbance ($A^1$) and by calculating the difference between the two wavenumbers. In the case where the absorption peak at the maximum absorption wavenumber ($n^1$) overlapped an absorption peak attributed to another constituent, the absorption peaks attributed to the different constituents were separated by least-squares method using a Gaussian function, and then the half width of the absorption peak at the maximum absorption wavenumber ($n^1$) was obtained in the same manner as described above. The half width of the peak and the value of the ratio (absorbance ($A^2$)/absorbance ($A^1$)) were calculated only in the case where the maximum absorption wavenumber ($n^1$) in the range of 800 $cm^{-1}$ to 1400 $cm^{-1}$ was located within the range of 1080 $cm^{-1}$ to 1130 $cm^{-1}$. For the composite structures of Comparative Examples 3 and 4 having a precursor layer of the layer (Y), the value of the ratio (absorbance ($A^{2'}$)/ absorbance ($A^{1'}$)) corresponding to the value of the ratio (absorbance ($A^2$)/absorbance ($A^1$)) in the layer (Y) was calculated. The absorbance ($A^{1'}$) and the absorbance ($A^{2'}$) were absorbances in an infrared absorption spectrum of the precursor layer of the layer (Y), and were respectively a maximum absorbance ($A^{1'}$) in the range of 800 $cm^{-1}$ to 1400 $cm^{-1}$ and a maximum absorbance ($A^{2'}$) exhibited in the range of 2500 $cm^{-1}$ to 4000 $cm^{-1}$ due to stretching vibration of hydroxyl groups.

(2) Appearance of Composite Structure

The appearances of the composite structures obtained were evaluated by visual observation as follows.

S: Very good appearance that was colorless, transparent, and uniform

A: Good appearance that was slightly opaque or non-uniform

B: No continuous layer was obtained such as due to the coating liquid being repelled (3) Oxygen Barrier Properties Before Retorting The oxygen transmission rate (OTR) was measured using an oxygen transmission amount measuring apparatus ("MO-CON OX-TRAN 2/20" manufactured by ModernControls, Inc.). Specifically, the composite structure was set in such a manner that the layer (Y) (or layer (Y')) faced the oxygen supply-side and the CPP layer described later faced the carrier gas-side, and then the oxygen transmission rate (in units of ml/($m^2$·day·atm)) was measured under conditions that the temperature was 20° C., the humidity on the oxygen supply-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(4) Oxygen Barrier Properties after Retorting

Two composite structures having a size of 12 cm×12 cm were fabricated. The two structures were stacked on each other in such a manner that the later-described CPP layers were located interiorly, and then the three sides of the stack were heat-sealed up to 5 mm from their ends. Distilled water was injected between the two heat-sealed composite structures in an amount of 80 g, and then the remaining fourth side was similarly heat-sealed. In this manner, a pouch containing distilled water was fabricated.

Next, the pouch was put into a retort sterilizer ("Flavor Ace RCS-60" manufactured by HISAKA WORKS, LTD.), and was subjected to retorting by hot-water immersion at 120° C. and 0.15 MPa for 30 minutes. After the retorting, the pouch was taken out of the retort sterilizer, and a composite structure having a size of 10 cm×10 cm was taken as a sample.

The oxygen transmission rate (OTR) was measured using an oxygen transmission amount measuring apparatus ("MO-CON OX-TRAN 2/20" manufactured by ModernControls, Inc.). Specifically, the composite structure was set in such a manner that the layer (Y) (or layer (Y')) faced the oxygen supply-side and the CPP layer described later faced the carrier gas-side, and then the oxygen transmission rate (in units of ml/($m^2$·day·atm)) was measured under conditions that the temperature was 20° C., the humidity on the oxygen supply-side was 85% RH, the humidity on the carrier gas-side was 85% RH, the oxygen pressure was 1 atm, and the carrier gas pressure was 1 atm. Nitrogen gas containing 2 vol % of hydrogen gas was used as the carrier gas.

(5) Water Vapor Barrier Properties Before Retorting

The moisture permeability (water vapor transmission rate: WVTR) was measured using a water vapor transmission amount measuring apparatus ("MOCON PERMATRAN 3/33" manufactured by ModernControls, Inc.). Specifically, the composite structure was set in such a manner that the layer (Y) (or layer (Y')) faced the water vapor supply-side and the CPP layer described later faced the carrier gas-side, and then the moisture permeability (in units of g/($m^2$·day)) was measured under conditions that the temperature was 40° C., the humidity on the water vapor supply-side was 90% RH, and the humidity on the carrier gas-side was 0% RH.

(6) Water Vapor Barrier Properties after Retorting

A sample subjected to retorting was obtained in the same manner as described in (4) Oxygen barrier properties after retorting. The moisture permeability (water vapor transmission rate: WVTR) of the obtained sample was measured using a water vapor transmission amount measuring apparatus ("MOCON PERMATRAN 3/33" manufactured by ModernControls, Inc.). Specifically, the composite structure was set in such a manner that the layer (Y) (or layer (Y')) faced the water vapor supply-side and the CPP layer described later faced the carrier gas-side, and then the moisture permeability (in units of g/(m²·day)) was measured under conditions that the temperature was 40° C., the humidity on the water vapor supply-side was 90% RH, and the humidity on the carrier gas-side was 0% RH.

(7) Particle Size of Particles in Coating Liquid (U)

The particle size of particles in each of the coating liquids (U) fabricated in the examples was measured by the method described below.

First, the coating liquid (U) was 100-fold diluted with pure water. A zeta-potential & particle-size analyzer ("ELSZ-2" manufactured by Otsuka Electronics Co., Ltd.) was used for the measurement. Specifically, the particle size was determined as follows: the diluted coating liquid (U) was put into a rectangular cell for particle size measurement; the cell was set in the analyzer; measurement was performed by dynamic light scattering method when the temperature of the measurement liquid reached 25° C.; a diffusion coefficient was determined from an autocorrelation function determined by photon correlation method; and an average particle diameter (hydrodynamic diameter) obtained by Einstein-Stokes equation was defined as the particle size of the particles.

Example 1

An amount of 28.53 parts by mass of aluminum hydroxide was added to 260.00 parts by mass of a 20 mass % sodium hydroxide solution, followed by heating to 95° C. to dissolve the aluminum hydroxide. The resultant solution was cooled to 40° C., followed by dropwise addition of 79.60 parts by mass of acetic acid to obtain an aqueous suspension (D1). Subsequently, the aqueous suspension (D1) was filtered, and then desalting of the obtained solid was performed by washing in 300 parts by mass of distilled water and the subsequent drying, whereby an aluminum compound (A1) was obtained. The aluminum compound (A1) was added to a solution containing 741.86 parts by mass of distilled water, 178.02 parts by mass of methanol, and 10.00 parts by mass of a 60% nitric acid under stirring of the solution with a homomixer (TK homomixer Model 2.5 manufactured by PRIMIX Corporation) (set at a peripheral speed of 19.8 m/s: 13500 rpm). Subsequently, stirring was performed at a liquid temperature of 20° C. to 30° C. for 60 minutes to obtain a dispersion liquid (S1).

Subsequently, 36.58 parts by mass of an 85 mass % phosphoric acid aqueous solution prepared as a solution (T1) and 5.00 parts by mass of a 5 mass % PVA aqueous solution were added dropwise under stirring with the homomixer (set at a peripheral speed of 19.8 m/s: 13500 rpm). The stirring was continued for further 5 minutes after the completion of the dropwise addition, and thus a coating liquid (U1) was obtained. For the obtained coating liquid (U1), the particle size of the particles in the coating liquid (U1) was measured by the method described above.

Next, an oriented polyethylene terephthalate film ("Lumirror P60" (trade name) manufactured by TORAY INDUSTRIES, INC. and having a thickness of 12 μm) was prepared as a base (this film may be abbreviated as "PET"). The coating liquid (U1) was coated onto the base (PET) with a bar coater in such a manner that the thickness after drying was 0.5 μm. Drying was performed at 100° C. for 5 minutes to form a precursor layer of a layer (Y1). The obtained layered body was subjected to heat treatment using a dryer at 180° C. for 1 minute, and thus a composite structure (A1) having a configuration of layer (Y1) (0.5 μm)/PET (12 μm) was obtained. For the obtained composite structure (A1), the infrared absorption spectrum of the layer (Y1) (layer (Y)) and the appearance of the composite structure were measured and evaluated by the methods described above.

Subsequently, a non-oriented polypropylene film ("RXC-21" (trade name) manufactured by Tohcello Co., Ltd. and having a thickness of 50 μm) was prepared (this film may be abbreviated as "CPP"). A two-component adhesive agent ("A-520" (trade name) and "A-50" (trade name) manufactured by Mitsui Takeda Chemicals, Inc.) was coated onto the CPP and then dried. The resultant product and the composite structure (A1) were laminated together. In this manner, a composite structure (B1) having a configuration of layer (Y1)/PET/adhesive agent/CPP was obtained. For the obtained composite structure (B1), the oxygen barrier properties and water vapor barrier properties before and after the retorting were evaluated by the methods described above.

Example 2

In the same manner as in Example 1 except that 1.0 N hydrochloric acid was used as the acid added to the aluminate solution, composite structures of Example 2 were produced, and measurement on and evaluation of the coating liquid and the composite structures were performed.

Example 3

An amount of 28.53 parts by mass of aluminum hydroxide was added to 260.00 parts by mass of a 20 mass % sodium hydroxide solution, followed by heating to 95° C. to dissolve the aluminum hydroxide. The resultant solution was added dropwise under stirring to 780.00 parts by mass of a 20 mass % ethanol aqueous solution (a mixed liquid of 624.00 parts by mass of distilled water and 156.00 parts by mass of ethanol) heated to 80° C. The obtained solution was cooled to 40° C., followed by dropwise addition of 79.40 parts by mass of acetic acid to obtain an aqueous suspension (D3). By performing the same procedures as in Example 1 subsequent to the operation of obtaining the suspension (D3), composite structures of Example 3 were produced, and measurement on and evaluation of the coating liquid and the composite structures were performed.

Example 4

In the same manner as in Example 3 except that the concentration of the ethanol aqueous solution was changed from 20 mass % to 70 mass %, composite structures of Example 4 were produced, and measurement on and evaluation of the coating liquid and the composite structures were performed.

Example 5

In the same manner as in Example 3 except that the ethanol aqueous solution was replaced by a methanol aqueous solution, composite structures of Example 5 were produced, and measurement on and evaluation of the coating liquid and the composite structures were performed.

Example 6

In the same manner as in Example 3 except that the ethanol aqueous solution was replaced by an isopropyl alcohol aqueous solution, composite structures of Example 6 were produced, and measurement on and evaluation of the coating liquid and the composite structures were performed.

Example 7

An amount of 28.53 parts by mass of aluminum hydroxide was added to 260.00 parts by mass of a 20 mass % sodium hydroxide solution, followed by heating to 95° C. to dissolve the aluminum hydroxide. The resultant solution was added dropwise under stirring to 780.00 parts by mass of a $5.00 \times 10^{-3}$ mass % PVA aqueous solution heated to 95° C. The resultant solution was cooled to 40° C., followed by dropwise addition of 80.10 parts by mass of acetic acid to obtain an aqueous suspension (D7). The suspension (D7) was dried with a hot-air dryer set at 70° C. for 24 hours, and then desalting of the obtained solid was performed by washing in 300.00 parts by mass of 25° C. distilled water and the subsequent drying, whereby an aluminum compound (A7) was obtained. By performing the same procedures as in Example 1 subsequent to the operation of obtaining the aluminum compound (A7), composite structures of Example 7 were produced, and measurement on and evaluation of the coating liquid and the composite structures were performed.

Example 8

In the same manner as in Example 1 except that the 60% nitric acid was not added, composite structures of Example 8 were produced, and measurement on and evaluation of the coating liquid and the composite structures were performed.

Example 9

In the same manner as in Example 1 except that the 5 mass % PVA aqueous solution was not added, composite structures of Example 9 were produced, and measurement on and evaluation of the coating liquid and the composite structures were performed.

Example 10

In the same manner as in Example 1 except that 5.00 parts by mass of a 5 mass % PAA aqueous solution was used instead of 5.00 parts by mass of the 5 mass % PVA aqueous solution, composite structures of Example 10 were produced, and measurement on and evaluation of the coating liquid and the composite structures were performed.

Example 11

In the same manner as in Example 1 except that 44.45 parts by mass of trimethyl phosphate was used instead of 36.58 parts by mass of the 85 mass % phosphoric acid aqueous solution, composite structures of Example 11 were produced, and measurement on and evaluation of the coating liquid and the composite structures were performed.

Example 12

In the same manner as in Example 1 except that the stirring speed of the homomixer was changed from a peripheral speed of 19.8 m/s (13500 rpm) to 16.1 m/s (11000 rpm), composite structures of Example 12 were produced, and measurement on and evaluation of the coating liquid and the composite structures were performed.

Example 13

In the same manner as in Example 1 except that the stirring speed of the homomixer was changed from a peripheral speed of 19.8 m/s (13500 rpm) to 11.7 m/s (8000 rpm), composite structures of Example 13 were produced, and measurement on and evaluation of the coating liquid and the composite structures were performed.

Example 14

In the same manner as in Example 1 except that Three-One Motor (BL 600 manufactured by Shinto Scientific Co., Ltd, stirring blade: dispersion type, stirring blade diameter: $\phi=50$ mm) set at a peripheral speed of 1.3 m/s was used instead of the homomixer, composite structures were produced, and measurement on and evaluation of the coating liquid and the composite structures were performed.

Example 15

In the same manner as in Example 14 except that the 60 mass % nitric acid was not added, composite structures of Example 15 were produced, and measurement on and evaluation of the coating liquid and the composite structures were performed.

Examples 16 to 19

In the same manner as in Example 1 except that the ratio (number of moles $(N_M)$)/(number of moles $(N_P)$) was changed in accordance with Table 1, composite structures of Examples 16 to 19 were produced, and measurement on and evaluation of the coating liquids and the composite structures were performed.

Example 20

In the same manner as in Example 1 except that an oriented nylon film ("EMBLEM ONBC" (trade name) manufactured by UNITIKA LTD. and having a thickness of 15 µm) was used as the base (this film may be abbreviated as "ONy"), composite structures of Example 20 were produced, and measurement on and evaluation of the coating liquid and the composite structures were performed.

Examples 21 and 22

In the same manner as in Example 1 except that the temperature of the heat treatment was changed in accordance with Table 1, composite structures of Examples 21 and 22 were produced, and measurement on and evaluation of the coating liquids and the composite structures were performed.

Comparative Example 1

An amount of 28.53 parts by mass of aluminum hydroxide was added to a solution containing 741.86 parts by mass of distilled water and 188.02 parts by mass of methanol under stirring of the solution with a homomixer (set at a peripheral speed of 19.8 m/s: 13500 rpm). Subsequently, stirring was performed at a liquid temperature of 20° C. to 30° C. for 60 minutes to obtain a dispersion liquid (SC1). Production of composite structures of Comparative Example 1 was performed by performing the same procedures as in Example 1 subsequent to the operation of obtaining the dispersion liquid (SC1). However, a uniform layer was not obtained due to poor dispersibility of the particles. Measurement on the coating liquid was performed.

Comparative Example 2

An amount of 28.53 parts by mass of aluminum hydroxide was added to a solution containing 741.86 parts by mass of distilled water, 178.02 parts by mass of methanol, and 10.00 parts by mass of a 60% nitric acid under stirring of the solution with a homomixer (set at a peripheral speed of 19.8 m/s: 13500 rpm). Subsequently, stirring was performed at a liquid temperature of 20° C. to 30° C. for 60 minutes to obtain a dispersion liquid (SC2). Production of composite structures of Comparative Example 2 was performed by performing the same procedures as in Example 1 subsequent to the operation of obtaining the dispersion liquid (SC2). However, a uniform layer was not obtained due to poor dispersibility of the particles. Measurement on the coating liquid was performed.

Comparative Examples 3 and 4

In the same manner as in Example 1 except that the ratio (number of moles $(N_M)$)/(number of moles $(N_P)$) was changed in accordance with Table 1, composite structures of Comparative Examples 3 and 4 were produced, and measurement on and evaluation of the coating liquids and the composite structures were performed.

Comparative Example 5

In the same manner as in Example 1 except that the temperature of the heat treatment was changed in accordance with Table 1, composite structures of Comparative Example 5 were produced, and measurement on and evaluation of the coating liquid and the composite structures were performed.

The production conditions for the above examples and comparative examples are shown in Table 1. The evaluation results are shown in Table 2 and Table 3. In the tables, "-" means "not used", "not calculable", "not carried out", "not measurable", or the like.

TABLE 1

| | | Starting material of | Aqueous suspension (D) | | | Hydroxyl-group containing organic polymer | | Dispersion liquid (S) Stirring means | |
|---|---|---|---|---|---|---|---|---|---|
| | | | Basic solution | | | | | | Peripheral |
| | Base (X) | aluminum compound | Type | Concentration (wt %) | Neutralizing acid | Type | Concentration (wt %) | Type | speed (m/s) |
| Example 1 | PET | Al(OH)$_3$ | NaOH | 20 | Acetic acid | — | — | Homomixer | 19.8 |
| Example 2 | PET | Al(OH)$_3$ | NaOH | 20 | Hydrochloric acid | — | — | Homomixer | 19.8 |
| Example 3 | PET | Al(OH)$_3$ | NaOH | 20 | Acetic acid | EtOH | 20 | Homomixer | 19.8 |
| Example 4 | PET | Al(OH)$_3$ | NaOH | 20 | Acetic acid | EtOH | 70 | Homomixer | 19.8 |
| Example 5 | PET | Al(OH)$_3$ | NaOH | 20 | Acetic acid | MeOH | 20 | Homomixer | 19.8 |
| Example 6 | PET | Al(OH)$_3$ | NaOH | 20 | Acetic acid | IPA | 20 | Homomixer | 19.8 |
| Example 7 | PET | Al(OH)$_3$ | NaOH | 20 | Acetic acid | PVA | 0.005 | Homomixer | 19.8 |
| Example 8 | PET | Al(OH)$_3$ | NaOH | 20 | Acetic acid | — | — | Homomixer | 19.8 |
| Example 9 | PET | Al(OH)$_3$ | NaOH | 20 | Acetic acid | — | — | Homomixer | 19.8 |
| Example 10 | PET | Al(OH)$_3$ | NaOH | 20 | Acetic acid | — | — | Homomixer | 19.8 |
| Example 11 | PET | Al(OH)$_3$ | NaOH | 20 | Acetic acid | — | — | Homomixer | 19.8 |
| Example 12 | PET | Al(OH)$_3$ | NaOH | 20 | Acetic acid | — | — | Homomixer | 16.1 |
| Example 13 | PET | Al(OH)$_3$ | NaOH | 20 | Acetic acid | — | — | Homomixer | 11.7 |
| Example 14 | PET | Al(OH)$_3$ | NaOH | 20 | Acetic acid | — | — | Three-One Motor | 1.3 |
| Example 15 | PET | Al(OH)$_3$ | NaOH | 20 | Acetic acid | — | — | Three-One Motor | 1.3 |
| Example 16 | PET | Al(OH)$_3$ | NaOH | 20 | Acetic acid | — | — | Homomixer | 19.8 |
| Example 17 | PET | Al(OH)$_3$ | NaOH | 20 | Acetic acid | — | — | Homomixer | 19.8 |
| Example 18 | PET | Al(OH)$_3$ | NaOH | 20 | Acetic acid | — | — | Homomixer | 19.8 |
| Example 19 | PET | Al(OH)$_3$ | NaOH | 20 | Acetic acid | — | — | Homomixer | 19.8 |
| Example 20 | ONy | Al(OH)$_3$ | NaOH | 20 | Acetic acid | — | — | Homomixer | 19.8 |
| Example 21 | PET | Al(OH)$_3$ | NaOH | 20 | Acetic acid | — | — | Homomixer | 19.8 |
| Example 22 | PET | Al(OH)$_3$ | NaOH | 20 | Acetic acid | — | — | Homomixer | 19.8 |
| Comparative Example 1 | PET | Al(OH)$_3$ | — | — | — | — | — | Homomixer | 19.8 |
| Comparative Example 2 | PET | Al(OH)$_3$ | — | — | — | — | — | Homomixer | 19.8 |
| Comparative Example 3 | PET | Al(OH)$_3$ | NaOH | 20 | Acetic acid | — | — | Homomixer | 19.8 |
| Comparative Example 4 | PET | Al(OH)$_3$ | NaOH | 20 | Acetic acid | — | — | Homomixer | 19.8 |
| Comparative Example 5 | PET | Al(OH)$_3$ | NaOH | 20 | Acetic acid | — | — | Homomixer | 19.8 |

TABLE 1-continued

|  | Solution (T) Phosphorus compound (B) | Coating liquid (U) | | | | Heat treatment step Temperature (° C.) |
|---|---|---|---|---|---|---|
|  |  | Polymer (C) | Acid compound (D) | Average particle diameter (nm) | $N_M/N_P$ |  |
| Example 1 | Phosphoric acid | PVA | Nitric acid | 965 | 1.15 | 180 |
| Example 2 | Phosphoric acid | PVA | Nitric acid | 1012 | 1.15 | 180 |
| Example 3 | Phosphoric acid | PVA | Nitric acid | 767 | 1.15 | 180 |
| Example 4 | Phosphoric acid | PVA | Nitric acid | 721 | 1.15 | 180 |
| Example 5 | Phosphoric acid | PVA | Nitric acid | 611 | 1.15 | 180 |
| Example 6 | Phosphoric acid | PVA | Nitric acid | 863 | 1.15 | 180 |
| Example 7 | Phosphoric acid | PVA | Nitric acid | 550 | 1.15 | 180 |
| Example 8 | Phosphoric acid | PVA | — | 1187 | 1.15 | 180 |
| Example 9 | Phosphoric acid | — | Nitric acid | 1211 | 1.15 | 180 |
| Example 10 | Phosphoric acid | PAA | Nitric acid | 1076 | 1.15 | 180 |
| Example 11 | Trimethyl Phosphate | PVA | Nitric acid | 1009 | 1.15 | 180 |
| Example 12 | Phosphoric acid | PVA | Nitric acid | 1311 | 1.15 | 180 |
| Example 13 | Phosphoric acid | PVA | Nitric acid | 1450 | 1.15 | 180 |
| Example 14 | Phosphoric acid | PVA | Nitric acid | 1750 | 1.15 | 180 |
| Example 15 | Phosphoric acid | PVA | — | 1890 | 1.15 | 180 |
| Example 16 | Phosphoric acid | PVA | Nitric acid | 1278 | 1.04 | 180 |
| Example 17 | Phosphoric acid | PVA | Nitric acid | 1543 | 3.57 | 180 |
| Example 18 | Phosphoric acid | PVA | Nitric acid | 1067 | 0.82 | 180 |
| Example 19 | Phosphoric acid | PVA | Nitric acid | 1720 | 4.48 | 180 |
| Example 20 | Phosphoric acid | PVA | Nitric acid | 1298 | 1.15 | 180 |
| Example 21 | Phosphoric acid | PVA | Nitric acid | 1132 | 1.15 | 150 |
| Example 22 | Phosphoric acid | PVA | Nitric acid | 1243 | 1.15 | 120 |
| Comparative Example 1 | Phosphoric acid | PVA | — | >7000 | 1.15 | 180 |
| Comparative Example 2 | Phosphoric acid | PVA | Nitric acid | >7000 | 1.15 | 180 |
| Comparative Example 3 | Phosphoric acid | PVA | Nitric acid | 941 | 0.34 | 180 |
| Comparative Example 4 | Phosphoric acid | PVA | Nitric acid | 1854 | 5.77 | 180 |
| Comparative Example 5 | Phosphoric acid | PVA | Nitric acid | 1231 | 1.15 | 100 |

[Abbreviations in Table]
PVA: Polyvinyl alcohol,
PAA: Polyacrylic acid,
MeOH: Methanol,
EtOH: Ethanol,
IPA: Isopropyl alcohol
$N_M/N_P$: The ratio of the number of moles ($N_M$) of metal atoms in the aluminum compound (A) to the number of moles ($N_P$) of phosphorous atoms derived from the phosphorus compound B

TABLE 2

|  | Layer configuration of composite structure (*1) | Infrared absorption spectrum | | | |
|---|---|---|---|---|---|
|  |  | $n^1$ (cm$^{-1}$) | Half width (cm$^{-1}$) | $A^2/A^1$ | Appearance |
| Example 1 | Layer (Y)/PET | 1110 | 43 | <0.1 | S |
| Example 2 | Layer (Y)/PET | 1111 | 42 | <0.1 | S |
| Example 3 | Layer (Y)/PET | 1108 | 39 | <0.1 | S |
| Example 4 | Layer (Y)/PET | 1107 | 36 | <0.1 | S |
| Example 5 | Layer (Y)/PET | 1108 | 38 | <0.1 | S |
| Example 6 | Layer (Y)/PET | 1106 | 36 | <0.1 | S |
| Example 7 | Layer (Y)/PET | 1100 | 35 | <0.1 | S |
| Example 8 | Layer (Y)/PET | 1111 | 43 | <0.1 | S |
| Example 9 | Layer (Y)/PET | 1110 | 43 | <0.1 | S |
| Example 10 | Layer (Y)/PET | 1110 | 42 | <0.1 | S |
| Example 11 | Layer (Y)/PET | 1111 | 42 | <0.1 | S |
| Example 12 | Layer (Y)/PET | 1112 | 51 | <0.1 | A |
| Example 13 | Layer (Y)/PET | 1113 | 56 | <0.1 | A |
| Example 14 | Layer (Y)/PET | 1115 | 62 | <0.1 | A |
| Example 15 | Layer (Y)/PET | 1118 | 112 | 0.21 | A |
| Example 16 | Layer (Y)/PET | 1113 | 34 | <0.1 | S |
| Example 17 | Layer (Y)/PET | 1118 | 121 | 0.22 | S |
| Example 18 | Layer (Y)/PET | 1115 | 33 | 0.16 | S |
| Example 19 | Layer (Y)/PET | 1126 | 153 | 0.30 | S |
| Example 20 | Layer (Y)/PET | 1114 | 39 | <0.1 | S |
| Example 21 | Layer (Y)/PET | 1112 | 52 | <0.1 | S |
| Example 22 | Layer (Y)/PET | 1114 | 74 | 0.15 | S |
| Comparative Example 1 | Layer (Y')/PET | 1070 | — | — | B |
| Comparative Example 2 | Layer (Y')/PET | 1075 | — | — | B |
| Comparative Example 3 | Layer (Y')/PET | 1140 | — | — | S |
| Comparative Example 4 | Layer (Y')/PET | 1148 | — | — | S |
| Comparative Example 5 | Layer (Y')/PET | 1078 | — | — | S |

(*1) Composite structure subjected to infrared absorption spectrum measurement and appearance evaluation

TABLE 3

| | Layer configuration of composite structure (*2) | Oxygen transmission rate | | Moisture permeability | |
|---|---|---|---|---|---|
| | | Before retorting | After retorting | Before retorting | After retorting |
| | | ml/(m$^2$ · day · atm) | | g/(m$^2$ · day) | |
| Example 1 | Layer (Y)/PET//CPP | 0.4 | 0.4 | 0.3 | 0.3 |
| Example 2 | Layer (Y)/PET//CPP | 0.4 | 0.4 | 0.3 | 0.3 |
| Example 3 | Layer (Y)/PET//CPP | 0.4 | 0.3 | 0.2 | 0.2 |
| Example 4 | Layer (Y)/PET//CPP | 0.2 | 0.2 | 0.2 | 0.2 |
| Example 5 | Layer (Y)/PET//CPP | 0.4 | 0.4 | 0.3 | 0.3 |
| Example 6 | Layer (Y)/PET//CPP | 0.3 | 0.4 | 0.3 | 0.2 |
| Example 7 | Layer (Y)/PET//CPP | 0.2 | 0.2 | 0.2 | 0.2 |
| Example 8 | Layer (Y)/PET//CPP | 0.5 | 0.4 | 0.3 | 0.3 |
| Example 9 | Layer (Y)/PET//CPP | 0.4 | 0.4 | 0.3 | 0.3 |
| Example 10 | Layer (Y)/PET//CPP | 0.4 | 0.4 | 0.3 | 0.3 |
| Example 11 | Layer (Y)/PET//CPP | 0.4 | 0.4 | 0.3 | 0.4 |
| Example 12 | Layer (Y)/PET//CPP | 0.4 | 0.4 | 0.3 | 0.3 |
| Example 13 | Layer (Y)/PET//CPP | 0.4 | 0.5 | 0.3 | 0.4 |
| Example 14 | Layer (Y)/PET//CPP | 0.5 | 0.6 | 0.4 | 0.5 |
| Example 15 | Layer (Y)/PET//CPP | 1.1 | 1.5 | 1.4 | 2.6 |
| Example 16 | Layer (Y)/PET//CPP | 0.4 | 0.5 | 0.3 | 0.4 |
| Example 17 | Layer (Y)/PET//CPP | 1.0 | 1.7 | 1.3 | 3.0 |
| Example 18 | Layer (Y)/PET//CPP | 0.8 | 1.0 | 1.2 | 2.4 |
| Example 19 | Layer (Y)/PET//CPP | 1.4 | 2.5 | 1.8 | 5.3 |
| Example 20 | Layer (Y)/PET//CPP | 0.4 | 0.4 | 0.3 | 0.3 |
| Example 21 | Layer (Y)/PET//CPP | 0.4 | 0.6 | 0.3 | 0.8 |
| Example 22 | Layer (Y)/PET//CPP | 0.8 | 1.0 | 1.2 | 3.0 |
| Comparative Example 1 | Layer (Y')/PET//CPP | >50 | >50 | >7 | >7 |
| Comparative Example 2 | Layer (Y')/PET//CPP | >50 | >50 | >7 | >7 |
| Comparative Example 3 | Layer (Y')/PET//CPP | >50 | >50 | >7 | >7 |
| Comparative Example 4 | Layer (Y')/PET//CPP | >50 | >50 | >7 | >7 |
| Comparative Example 5 | Layer (Y')/PET//CPP | >50 | >50 | >7 | >7 |

(*2) Composite structure subjected to measurement of oxygen transmission rate and moisture permeability
"//" in the table represents an adhesive layer As is clear from the tables, the composite structures of Examples exhibited excellent oxygen barrier properties and water vapor barrier properties not only before retorting but also after retorting. In addition, the composite structures of Examples had good appearance. The composite structures of Examples 4 and 7 exhibited higher oxygen barrier properties and water vapor barrier properties than the composite structure of Example 1. In addition, the maximum absorption wavenumbers (n$^1$) in the composite structures of Examples were in the range of 1100 cm$^{-1}$ to 1126 cm$^{-1}$.

INDUSTRIAL APPLICABILITY

According to the production method of the present invention, a composite structure that is excellent in both gas barrier properties and water vapor barrier properties and that can maintain both of the barrier properties at high levels even after retorting can be obtained inexpensively and simply. In addition, the composite structure of the present invention is excellent in appearance. Therefore, the composite structure of the present invention can be preferably used as a packaging material for foods, chemicals, medical devices, industrial materials, and garments. Among such uses, the composite structure of the present invention can be particularly preferably used for forming a food packaging material (particularly a packaging material for retort foods) required to have barrier properties against both oxygen and water vapor.

The invention claimed is:
1. A coating liquid, produced by a method comprising:
   (I) preparing a dispersion liquid (S) including an aluminum compound (A); and
   (II) mixing at least the dispersion liquid (S) and a phosphorus compound (B) having a site capable of reacting with the aluminum compound (A),
   wherein
   the aluminum compound (A) is formed by adding an acid to an aluminate solution,
   a number of moles ($N_M$) of aluminum atoms derived from the aluminum compound (A) and a number of moles ($N_P$) of phosphorus atoms derived from the phosphorus compound (B) satisfy $0.8 \leq (N_M)/(N_P) \leq 4.5$,
   the coating liquid further comprises at least one acid compound (D) selected from the group consisting of acetic acid, hydrochloric acid, nitric acid, trifluoroacetic acid, and trichloroacetic acid, and
   particles in the coating liquid have a particle size of 2000 nm or less.
2. The coating liquid according to claim 1, wherein said preparing (I) comprises:
   (I-a) adding the acid to the aluminate solution so as to obtain an aqueous suspension (D') including the aluminum compound (A), and
   (I-b) removing a solvent of the aqueous suspension (D') and then performing desalting so as to obtain the aluminum compound (A).
3. The coating liquid according to claim 1, wherein the aluminate solution includes an organic compound containing a hydroxyl group.

4. The coating liquid according to claim 1, wherein the aluminate solution includes a polymer (C) containing at least one functional group (f) selected from the group consisting of a hydroxyl group, a carboxyl group, a carboxylic acid anhydride group, and a salt of a carboxyl group.

5. The coating liquid according to claim 3, wherein the aluminate solution includes a polymer containing a hydroxyl group.

6. The coating liquid according to claim 2, wherein said preparing (I) further comprises:
(I-c) dispersing the aluminum compound (A) obtained in said removing (I-b) into a liquid by high-shear stirring so as to prepare the dispersion liquid (S).

7. The coating liquid according to claim 1, wherein the phosphorus compound (B) is at least one compound selected from the group consisting of phosphoric acid, a polyphosphoric acid, phosphorous acid, phosphonic acid, and a derivative thereof.

8. The coating liquid according to claim 4, comprising the polymer (C).

9. The coating liquid according to claim 8, wherein the polymer (C) is at least one polymer selected from the group consisting of a polyvinyl alcohol, an ethylene-vinyl alcohol copolymer, a polysaccharide a polyacrylic acid, a salt of a polyacrylic acid, a polymethacrylic acid, and a salt of a polymethacrylic acid.

10. A method for producing a composite structure, the method comprising:
applying the coating liquid according to claim 1 onto a base (X) so as to form a precursor layer of a layer (Y) on the base (X); and
subjecting the precursor layer to a heat treatment at a temperature of 110° C. or more so as to form the layer (Y).

11. The production method according to claim 10, wherein
said preparing (I) in producing the coating liquid comprises:
(I-a) adding the acid to the aluminate solution so as to obtain an aqueous suspension (D') including the aluminum compound (A); and
(I-b) removing a solvent of the aqueous suspension (D') and then performing desalting so as to obtain the aluminum compound (A), and
said mixing (II) in producing the coating liquid is a mixing of the dispersion liquid (S) and a solution (T) including the phosphorus compound (B) so as to prepare the coating liquid.

12. The production method according to claim 11, wherein the aluminate solution includes an organic compound containing a hydroxyl group.

13. The production method according to claim 10, wherein the aluminate solution includes a polymer (C) containing at least one functional group (f) selected from the group consisting of a hydroxyl group, a carboxyl group, a carboxylic acid anhydride group, and a salt of a carboxyl group.

14. The production method according to claim 10, wherein the aluminate solution includes a polymer containing a hydroxyl group.

15. The production method according to claim 11, wherein said preparing (I) in producing the coating liquid further comprises:
(I-c) dispersing the aluminum compound (A) obtained in said removing (I-b) into a liquid by high-shear stirring so as to prepare the dispersion liquid (S).

16. The production method according to claim 10, wherein the phosphorus compound (B) is at least one compound selected from the group consisting of phosphoric acid, a poly-phosphoric acid, phosphorous acid, phosphonic acid, and a derivative thereof.

17. The production method according to claim 10, wherein the coating liquid comprises a polymer (C), which comprises at least one functional group (f) selected from the group consisting of a hydroxyl group, a carboxyl group, a carboxylic acid anhydride group, and a salt of a carboxyl group.

18. The production method according to claim 17, wherein the polymer (C) is at least one polymer selected from the group consisting of a polyvinyl alcohol, an ethylene-vinyl alcohol copolymer, a polysaccharide, a polyacrylic acid, a salt of a polyacrylic acid, a polymethacrylic acid, and a salt of a polymethacrylic acid.

19. A composite structure, comprising:
a base (X), and
a layer (Y) on the base (X),
wherein
the layer (Y) is obtained by subjecting a precursor layer, which is formed by applying the coating liquid according to claim 1 onto the base (X), to a heat treatment at a temperature of 110° C. or more.

20. The composite structure according to claim 19, wherein the layer (Y), whose infrared absorption spectrum is measured in a range of 800 $cm^{-1}$ to 1400 $cm^{-1}$, has a wavenumber ($n^1$) at which maximum infrared absorption occurs in a range of 1080 $cm^{-1}$ to 1130 $cm^{-1}$.

21. The composite structure according to claim 19, wherein the base (X) is in the form of a layer.

22. The composite structure according to claim 21, wherein the base (X) comprises at least one layer selected from the group consisting of a thermoplastic resin film layer, a paper layer, and an inorganic deposited layer.

23. The composite structure according to claim 19, which has a moisture permeability measured under conditions of 40° C. and 90/0% RH of 5 g/($m^2$·day) or less.

24. The composite structure according to claim 19, which has an oxygen transmission rate measured under conditions of 20° C. and 85% RH of 1 ml/($m^2$·day·atm) or less.

25. The composite structure according to claim 19, which has a moisture permeability measured under conditions of 40° C. and 90/0% RH after immersion in 120° C. hot water for 30 minutes not more than twice a moisture permeability measured under conditions of 40° C. and 90/0% RH before the immersion.

26. The composite structure according to claim 19, which has an oxygen transmission rate measured under conditions of 20° C. and 85% RH after immersion in 120° C. hot water for 30 minutes not more than twice an oxygen transmission rate measured under conditions of 20° C. and 85% RH before the immersion.

27. A packaging material, comprising:
the composite structure according to claim 19.

28. The packaging material according to claim 27, which is for retort foods.

29. A formed product, comprising:
the packaging material according to claim 27.

30. The formed product according to claim 29, which is a vertical fill form seal pouch, a vacuum packaging pouch, a spout pouch, a laminated tube container, an infusion bag, a container cover, a paper container, or a vacuum insulator.

* * * * *